(12) United States Patent
Ukisu et al.

(10) Patent No.: US 12,448,227 B2
(45) Date of Patent: Oct. 21, 2025

(54) INTER-CONTAINER TRANSFER APPARATUS AND INTER-CONTAINER TRANSFER METHOD

(71) Applicant: Daifuku Co., Ltd., Osaka (JP)

(72) Inventors: Kenichi Ukisu, Tokyo (JP); Atsushi Minoo, Tokyo (JP); Takeshi Sugimoto, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 299 days.

(21) Appl. No.: 18/130,954

(22) Filed: Apr. 5, 2023

(65) Prior Publication Data
US 2023/0322503 A1  Oct. 12, 2023

(30) Foreign Application Priority Data

Apr. 6, 2022 (JP) ................. 2022-063608

(51) Int. Cl.
| | |
|---|---|
| B65G 47/56 | (2006.01) |
| B65G 43/08 | (2006.01) |
| B65G 47/52 | (2006.01) |
| B65G 47/54 | (2006.01) |
| B65G 47/57 | (2006.01) |
| B65G 47/90 | (2006.01) |
| B65G 65/23 | (2006.01) |

(52) U.S. Cl.
CPC ............ *B65G 47/90* (2013.01); *B65G 43/08* (2013.01); *B65G 47/52* (2013.01); *B65G 65/23* (2013.01); *B65G 2203/0208* (2013.01)

(58) Field of Classification Search
CPC ........ B65G 43/08; B65G 47/52; B65G 47/54; B65G 47/56; B65G 47/57; B65G 47/90; B65G 47/94; B65G 65/23
USPC ............................................ 198/418.6, 468.2
See application file for complete search history.

(56) References Cited

U.S. PATENT DOCUMENTS

| | | | | |
|---|---|---|---|---|
| 4,465,174 A * | 8/1984 | Uhl | ........................ | B65G 47/57 198/361 |
| 7,748,519 B2 * | 7/2010 | Freudelsperger | ...... | B65G 69/16 198/523 |
| 8,485,341 B2 * | 7/2013 | Woerz | .................. | B65G 47/268 198/418.9 |
| 8,998,554 B2 * | 4/2015 | Toebes | .................. | B65G 17/123 414/331.04 |
| 9,783,369 B1 * | 10/2017 | Daun | ..................... | B65G 47/82 |
| 10,618,747 B2 * | 4/2020 | Flammann | ........... | B65G 47/715 |

(Continued)

FOREIGN PATENT DOCUMENTS

| | | | |
|---|---|---|---|
| EP | 3409621 A1 * | 12/2018 | ............. B65G 13/06 |
| JP | 201876177 A | 5/2018 | |
| JP | 2019104571 A | 6/2019 | |

*Primary Examiner* — Douglas A Hess
(74) *Attorney, Agent, or Firm* — The Webb Law Firm

(57) ABSTRACT

An inversion mechanism inverts a first container held by a holding mechanism with a first opening directed upward, and directs the first opening downward. A movement mechanism moves the holding mechanism so that the first opening directed downward faces a second opening from above. The opening and closing drive mechanism brings an opening and closing member into the closed state while the holding mechanism is inverted by the inversion mechanism and while the holding mechanism is moved by the movement mechanism, and brings the opening and closing member into the open state in response to the first opening facing the second opening.

8 Claims, 11 Drawing Sheets

(56) References Cited

U.S. PATENT DOCUMENTS

| | | | |
|---|---|---|---|
| 10,954,080 B1* | 3/2021 | Dickey | B65G 47/252 |
| 11,760,519 B2* | 9/2023 | Morikubo | B65G 59/04 |
| | | | 53/235 |
| 12,240,707 B2* | 3/2025 | Bretz | B65G 47/38 |
| 2019/0177095 A1 | 6/2019 | Ukisu et al. | |
| 2024/0199349 A1* | 6/2024 | Deshpande et al. | |

* cited by examiner

INTER-CONTAINER TRANSFER APPARATUS AND INTER-CONTAINER TRANSFER METHOD

CROSS REFERENCE TO RELATED APPLICATION

This application claims priority to Japanese Patent Application No. 2022-063608 filed on Apr. 6, 2022, the disclosure of which is hereby incorporated by reference in its entirety.

BACKGROUND OF THE INVENTION

1. Field of the Invention

The present invention relates to an inter-container transfer apparatus and an inter-container transfer method for transferring articles contained in a first container to a second container.

2. Description of the Related Art

For example, JP 2019-104571A (Patent Document 1) discloses an article conveyance facility provided with a transfer apparatus for transferring articles between different containers. Hereinafter, the reference signs indicated in the parentheses in the description of the background correspond to those used in Patent Document 1.

The transfer apparatus (3) disclosed in Patent Document 1 is configured to transfer articles (W) contained in one container (C2) to another container (C1). The one container (C2) contains a plurality of articles (W). Upon completion of transfer of all of the articles (W) from the one container (C2) to the other container (C1), the other container (C1) is conveyed to a destination place.

The transfer apparatus (3) disclosed in Patent Document 1 uses an arm (16) having a suction pad (17) to transfer the articles (W) from the one container (C2) to the other container (C1) one by one. Therefore, for example, if all of the articles (W) contained in the one container (C2) are to be transferred to the other container (C1), it is difficult to increase transfer efficiency. Accordingly, it is conceivable to transfer all of the articles (W) contained in the one container (C2) together to the other container (C1), by tilting the one container (C2) using, e.g., a transfer apparatus of another structure without any arm or by manpower, or through other approaches. However, in this case, the articles (W) are likely to be distributed in an imbalanced manner within the tilted container (C2), and as a result, the articles (W) are likely to be arranged also in the other container (C1), which is a transfer destination, in an imbalanced manner. Thus, there may be cases where the articles (W) cannot appropriately be transferred.

SUMMARY OF THE INVENTION

In the light of the above-described circumstances, it is desirable to realize a technique with which it is possible to appropriately transfer articles between different containers, and increase the transfer efficiency.

The techniques for solving the above-described problems are as follows.

The inter-container transfer apparatus according to the present disclosure relates to an inter-container transfer apparatus for transferring articles contained in a first container to a second container, wherein the first container has a bottom portion that is closed, and a top portion that is a first opening,
the second container has a bottom portion that is closed, and a top portion that is a second opening,
the inter-container transfer apparatus includes:
  a holding mechanism configured to hold the first container;
  a movement mechanism configured to move the holding mechanism;
  an inversion mechanism configured to invert an up-down relationship between the bottom portion and the top portion of the first container held by the holding mechanism;
  an opening and closing member changeable between (i) a closed state, in which the opening and closing member is arranged in the first opening of the first container to close the first opening, and (ii) an open state of opening the first opening; and
  an opening and closing drive mechanism configured to drive the opening and closing member to perform an opening/closing operation,
while the first container is held by the holding mechanism with the first opening directed upward, the inversion mechanism inverts the first container to direct the first opening downward,
the movement mechanism moves the holding mechanism so that (i) the first container is located above the second container, and (ii) the first container and the second container overlap each other when viewed in an up-down direction, and
the opening and closing drive mechanism brings the opening and closing member into the closed state while the holding mechanism is being inverted by the inversion mechanism and while the holding mechanism is being moved by the movement mechanism, and brings the opening and closing member into the open state in response to the downward-directed first opening facing the second opening from above.

An inter-container transfer method according to the present disclosure relates to an inter-container transfer method for transferring articles contained in a first container to a second container,
the first container having a bottom portion that is closed, and a top portion that is a first opening,
the second container having a bottom portion that is closed, and a top portion that is a second opening,
the inter-container transfer method being performed using an inter-container transfer apparatus including: a holding mechanism configured to hold the first container; a movement mechanism configured to move the holding mechanism; an inversion mechanism configured to invert an up-down relationship between the bottom portion and the top portion of the first container held by the holding mechanism; an opening and closing member changeable between (i) a closed state, in which the opening and closing member is arranged in the first opening of the first container held by the holding mechanism to close the first opening, and (ii) an open state of opening the first opening; and an opening and closing drive mechanism configured to drive the opening and closing member to perform an opening/closing operation,
the inter-container transfer method including:
a first container holding step of holding the first container in which the articles are contained with the first opening directed upward, with use of the holding mechanism;

an opening and closing member arrangement step of arranging the opening and closing member in the closed state in the first opening of the first container;

an inversion step of inverting, while the first container is held by the holding mechanism with the first opening directed upward, the first container to direct the first opening downward with use of the inversion mechanism, the inversion step being performed after the first container holding step and the opening and closing member arrangement step;

a movement step of moving the holding mechanism so that (i) the first container is located above the second container, and (ii) the first container and the second container overlap each other when viewed in an up-down direction; and a transfer step of bringing the opening and closing member from the closed state into the open state, in response to the downward-directed first opening facing the second opening from above, and transferring the articles contained in the first container into the second container, the transfer step being performed after the inversion step and the movement step.

According to the present configuration, the first container in which articles are contained is arranged above the second container so that the downward-directed first opening faces the upward-directed second opening. By opening the opening and closing member in this state, it is possible to transfer the articles from the first container to the second container. With this, when a plurality of articles are contained in the first container, the plurality of articles W can be together transferred to the second container. Accordingly, it is possible to increase the efficiency of transfer of articles. Also, according to the present configuration, in order to achieve the state in which the downward-directed first opening faces the upward-directed second opening, the up-down relationship between the bottom portion and the top portion of the first container is inverted by the inversion mechanism. Arranging the opening and closing member in the closed state in the first opening can avoid the articles W from falling from the first container, and can suppress imbalanced distribution of the articles W in the first container. Thereafter, it is thus possible to appropriately transfer the articles to the second container. According to the present configuration, as described above, it is possible to appropriately transfer articles between different containers, and increase the transfer efficiency.

Further features and advantages of the technique according to the present disclosure will become apparent from the following description of exemplary and non-limiting embodiments given with reference to the drawings.

DESCRIPTION OF THE INVENTION

An inter-container transfer apparatus is an apparatus that transfers articles between different containers, and is configured to transfer articles contained in a first container to a second container. Hereinafter, an embodiment of an inter-container transfer apparatus will be described, exemplifying a case where the inter-container transfer apparatus is provided in an article conveyance facility for storing and conveying articles.

Figure 1:
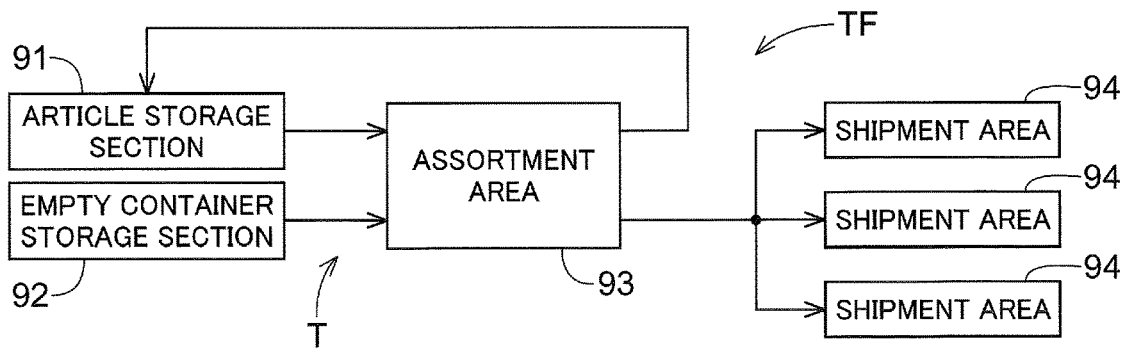
FIG. 1 is a diagram schematically illustrating an article conveyance facility provided with an inter-container transfer apparatus.

FIG. 1 is a schematic diagram showing an article conveyance facility TF. The article conveyance facility TF is a facility that ships article W (see FIG. 2) based on order information, and is used in a distribution warehouse, for example. Order information refers to information that indicates types and number of articles designated for each shipment destination. A shipment destination refers to a destination at which articles W shipped from the article conveyance facility TF are to be received, and examples thereof include a store that sells the articles W and a factory that uses the articles W.

The article conveyance facility TF includes an article storage section 91 for storing articles W, an empty container storage section 92 for storing empty containers, an assortment area 93 for assorting articles W, a plurality of shipment areas 94, and a conveyance system T.

Figure 3:
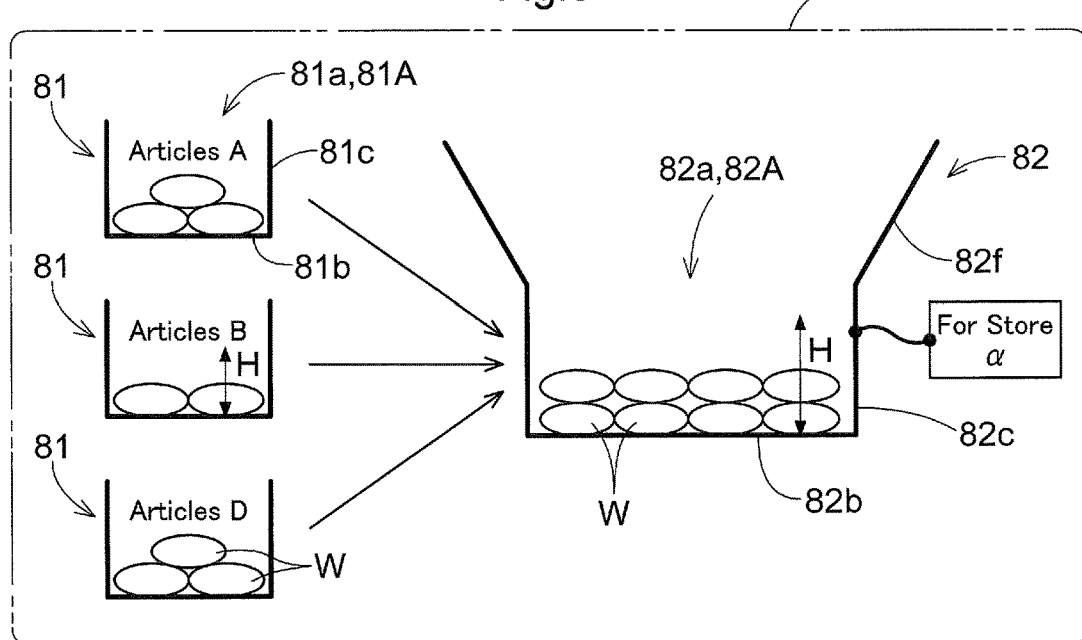
FIG. 3 illustrates assortment work.

The article storage section 91 is configured to store first containers 81 (see FIG. 3) in which articles W are contained. With this, the article storage section 91 stores the articles W. As shown in FIG. 3, a first container 81 is configured to contain a plurality of articles W of the same type. FIG. 3 shows, as examples, three first containers 81 each containing a different type of articles W. In FIG. 3, "article A", "article B", and "article C" respectively denote different types of articles W.

The containers to be stored in the empty container storage section 92 are second containers 82 (see FIG. 3). The second containers 82 are shipment containers for use in shipping articles W. A plurality of second containers 82 are stored in the empty container storage section 92.

Articles W stored in the article storage section 91 are selected based on order information, and are conveyed to the assortment area 93. The first containers 81 containing the article W are conveyed from the article storage section 91 to the assortment area 93 by the conveyance system T.

Second containers 82 stored in the article storage section 92 are selected based on order information, and are conveyed to the assortment area 93. The second containers 82 are conveyed from the empty container storage section 92 to the assortment area 93 by the conveyance system T. Note that the second containers 82 are empty when stored in the empty container storage section 92, and articles W to be shipped are contained in the second containers 82 by assortment work in the assortment area 93, as will be described later. Therefore, no matter which second containers 82 are selected as an object to be conveyed, the selection itself does not (or hardly) affect the assortment work. Therefore, second containers 82 to be conveyed from the empty container storage section 92 may be selected as appropriate regardless of order information.

Figure 2:
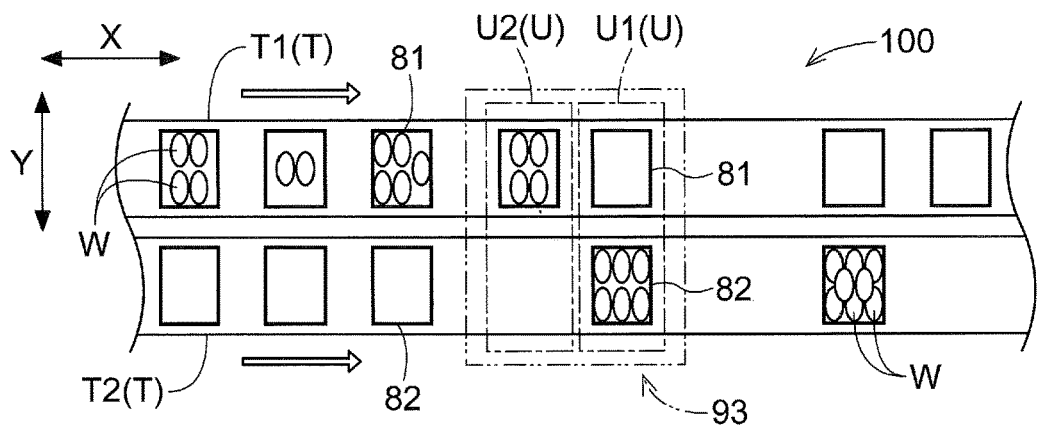
FIG. 2 is a plan view illustrating an assortment area.

As shown in FIG. 2, the first containers 81 in which articles W are contained and the empty second containers 82 are conveyed to the assortment area 93 by the conveyance system T. In the assortment area 93, transfer operations of transferring the articles W contained in the first containers 81 to the second containers 82 are performed by an inter-container transfer apparatus 100. In the present embodiment, the inter-container transfer apparatus 100 is provided in an area including the assortment area 93. Note that in FIG. 2, to avoid complication of the drawing, the main portion of the inter-container transfer apparatus 100 is shown in a simplified manner. The configuration of the main portion will be described later.

In the present embodiment, the inter-container transfer apparatus 100 includes a first conveyance device T1 that conveys the first containers 81 in the first direction X, and a second conveyance device T2 that is arranged in parallel to the first conveyance device T1 and conveys the second containers 82 in the first direction X. The first conveyance device T1 and the second conveyance device T2 are arranged apart from each other in a second direction Y that intersects with the first direction X when viewed in an up-down direction Z. Both the first direction X and the second direction Y are defined as intersecting with the up-down direction Z. In the present embodiment, the first direction X and the second direction Y are two horizontal directions orthogonal to each other. The first conveyance device T1 and the second conveyance device T2 employ conveyors. Such conveyors may be conveyors of a well-known structure, such as roller conveyors, belt conveyors, and chain conveyors. In the present embodiment, the first conveyance device T1 and the second conveyance device T2 constitute part of the conveyance system T. Note that constituent components other than the first conveyance device T1 and the second conveyance device T2 in the conveyance system T may employ a conveyor, or may employ a conveyance means such as, e.g., an automated guided vehicle.

The first conveyance device T1 is configured to convey the first containers 81 in the first direction X at least in the assortment area 93. In the present embodiment, the first conveyance device T1 is configured to convey the first containers 81 in the first direction X also in a carry-in route (on the upstream side of the assortment area 93) for carrying the first containers 81 into the assortment area 93, and in a carry-out route (on the downstream side of the assortment area 93) for carrying the first containers 81 out of the assortment area 93. However, the present invention is not limited to this, and the first conveyance device T1 may be configured to convey the first containers 81 in any direction in the carry-in route and the carry-out route.

Similarly, the second conveyance device T2 is configured to convey the second containers 82 in the first direction X at least in the assortment area 93. In the present embodiment, the second conveyance device T2 is configured to convey the second containers 82 in the first direction X also in the carry-in route (on the upstream side of the assortment area 93) for carrying the second containers 82 into the assortment area 93, and in the carry-out route (on the downstream side of the assortment area 93) for carrying the second containers 82 out of the assortment area 93. However, the present invention is not limited to this, and the second conveyance device T2 may be configured to convey the second containers 82 in any direction in the carry-in route and the carry-out route. Note that according to the present example, although the first conveyance device T1 and the second conveyance device T2 are configured to convey the corresponding containers in the same direction (first direction X) in the carry-in routes and carry-out routes adjacent to the assortment area 93, the first conveyance device T1 and the second conveyance device T2 may be configured to convey the corresponding containers in different directions (for example, to opposite sides in the first direction X).

In the present embodiment, the transfer operation that is performed in the assortment area 93 is an operation for performing assortment work of creating an ordered article set composed of a plurality of articles W based on order information. For additional description, as shown in FIG. 3, each of the plurality of first containers 81 to be conveyed to the assortment area 93 contains a plurality of articles W constituting part of the ordered article set. As a result of all of the articles W contained in the plurality of first containers 81 being transferred to a second container 82, the ordered article set is created in the second container 82. In the example shown in FIG. 3, the ordered article set to be contained in the second container 82 is composed of a plurality of articles A, a plurality of articles B, and a plurality of articles D. The plurality of articles A, the plurality of articles B, and the plurality of articles D are contained in different first containers 81. From the plurality of first containers 81 containing different articles W (articles A, B, and D), the inter-container transfer apparatus 100 transfers the articles W to the second container 82. Then, the second container 82 is conveyed toward the shipment area 94 (see FIG. 1) that corresponds to a shipment destination based on the order information. In the example shown in FIG. 3, by assortment work, the ordered article set for a store a are contained in the second container 82. The second container 82 is conveyed to, out of the plurality of shipment areas 94, the shipment area 94 where shipment to the store a is to be prepared and operated.

As described above, as a result of the articles W contained in the first containers 81 being transferred to the second container 82, the articles W are contained in the second container 82.

Here, as shown in FIG. 3, the first containers 81 and the second container 82 each have a bottom portion (81*b*, 82*b*) that is closed, and a top portion (81*a*, 82*a*) that is an opening. Also, the first container 81 has a side wall portion 81*c* standing upright from a peripheral edge of the bottom portion 81*b* of the first container 81 in a container height direction H. Similarly, the second container 82 has a side wall portion 82*c* standing upright from a peripheral edge of the bottom portion 82*b* of the second container 82 in the container height direction H. That is to say, the first containers 81 and the second containers 82 have the shape of a box with only the top portion (81*a*, 82*a*) open. Hereinafter, the opening of the first container 81 is defined as a first opening 81A, and the opening of the second container 82 is defined as a second opening 82A. Note that the above-described "container height direction H" is a direction connecting the bottom portion 81*b* and the top portion 81*a* of the first container 81. Also, the container height direction H is a direction connecting the bottom portion 82*b* and the top portion 82a of the second container 82. That is to say, the "container height direction H" is a direction defined on the basis of the containers.

As shown in FIG. 2, in the present embodiment, the first container 81 has a rectangular shape when viewed in a plan view. Similarly, the second container 82 has a rectangular shape when viewed in a plan view. However, the present invention is not limited to this, and the shape of the first container 81 when viewed in a plan view may be a polygonal shape, a precise circular shape, or an ellipsoidal shape. The same applies to the second container 82.

In the present embodiment, the first container 81 is made of a resin. In the present example, the first container 81 has a rigidity higher than that of the second container 82, and is less affected than the second container 82 by application of an external force. In other words, the first container 81 has a configuration such that it is less likely to deform than the second container 82.

In the present embodiment, the second container 82 is a carton container having flaps 82f for closing the second opening 82A. The flaps 82f are used to close, before shipment, the second opening 82A of the second container 82 in which an ordered article set is contained. Here, in order to allow smooth transfer of articles W from the first containers 81 to the second container 82, the second container 82 is conveyed to the assortment area 93 in a state in which the second opening 82A is not closed by the flaps 82f. Also, in the present embodiment, the second opening 82A is larger than the first opening 81A. Also, the volume of the second container 82 is larger than the volume of the first container 81. With this, the second container 82 can contain a larger number of articles W than that of the first container 81, and can fully achieve the function as a shipment container that contains an ordered article set and ships it.

Figure 4:
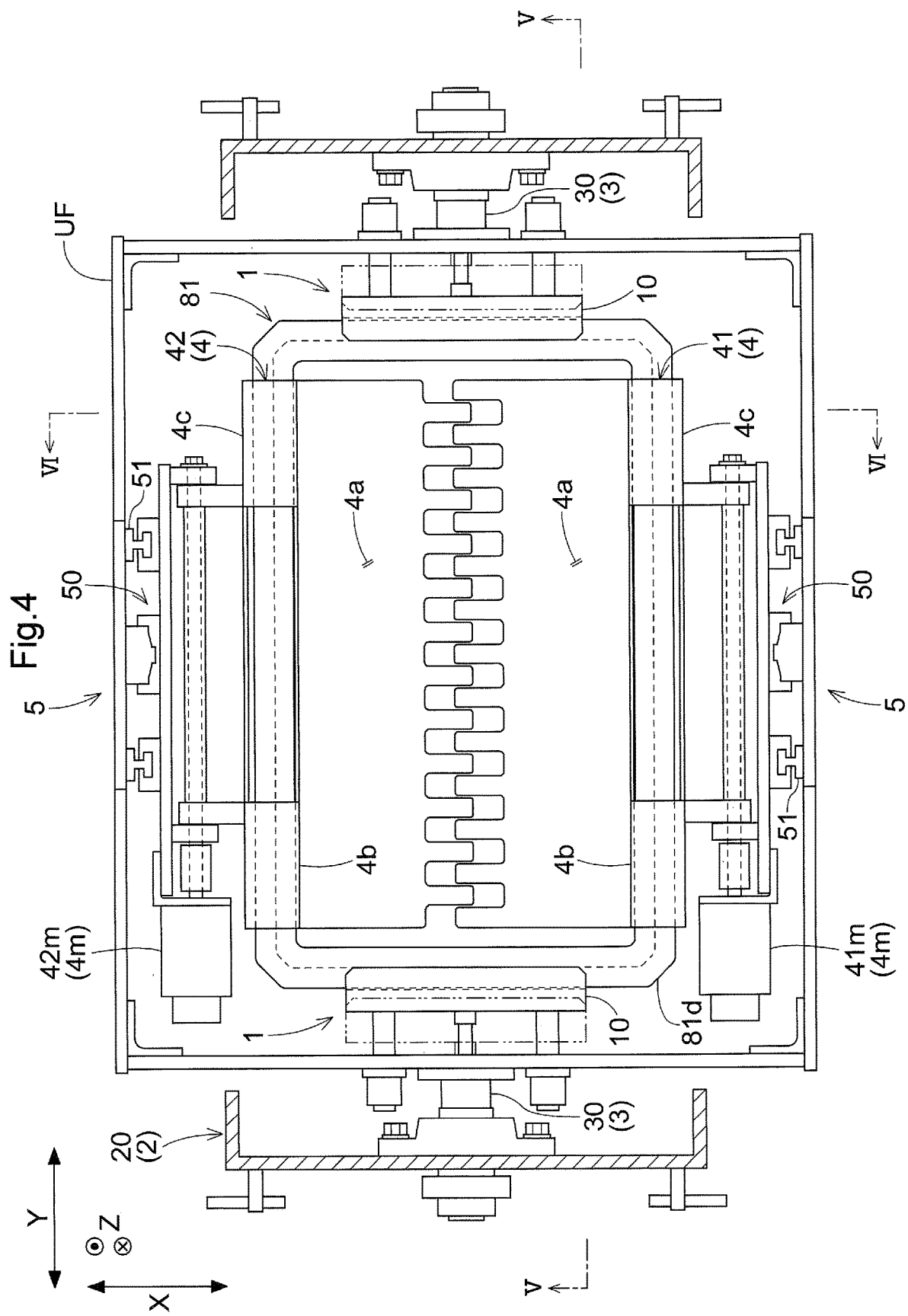
FIG. 4 is a plan view illustrating a holding mechanism, an opening and closing drive mechanism, and an adjustment mechanism.
Figure 5:
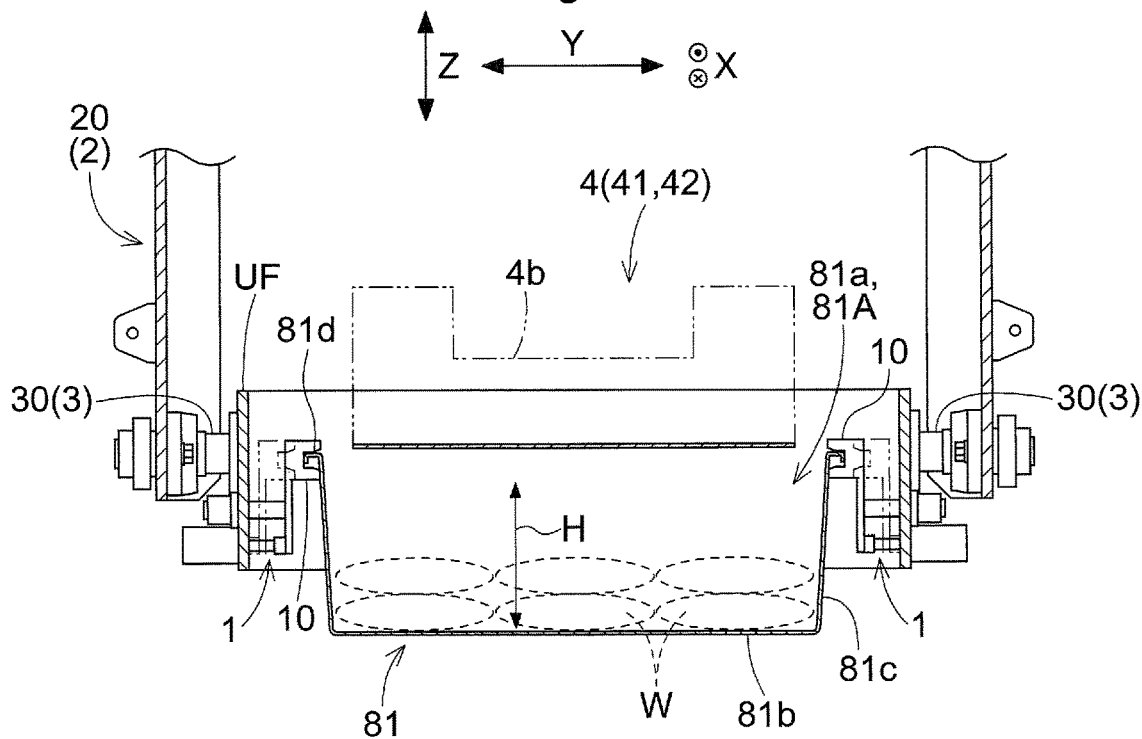
FIG. 5 is a cross-sectional view taken along a line V-V in FIG. 4.
Figure 6:
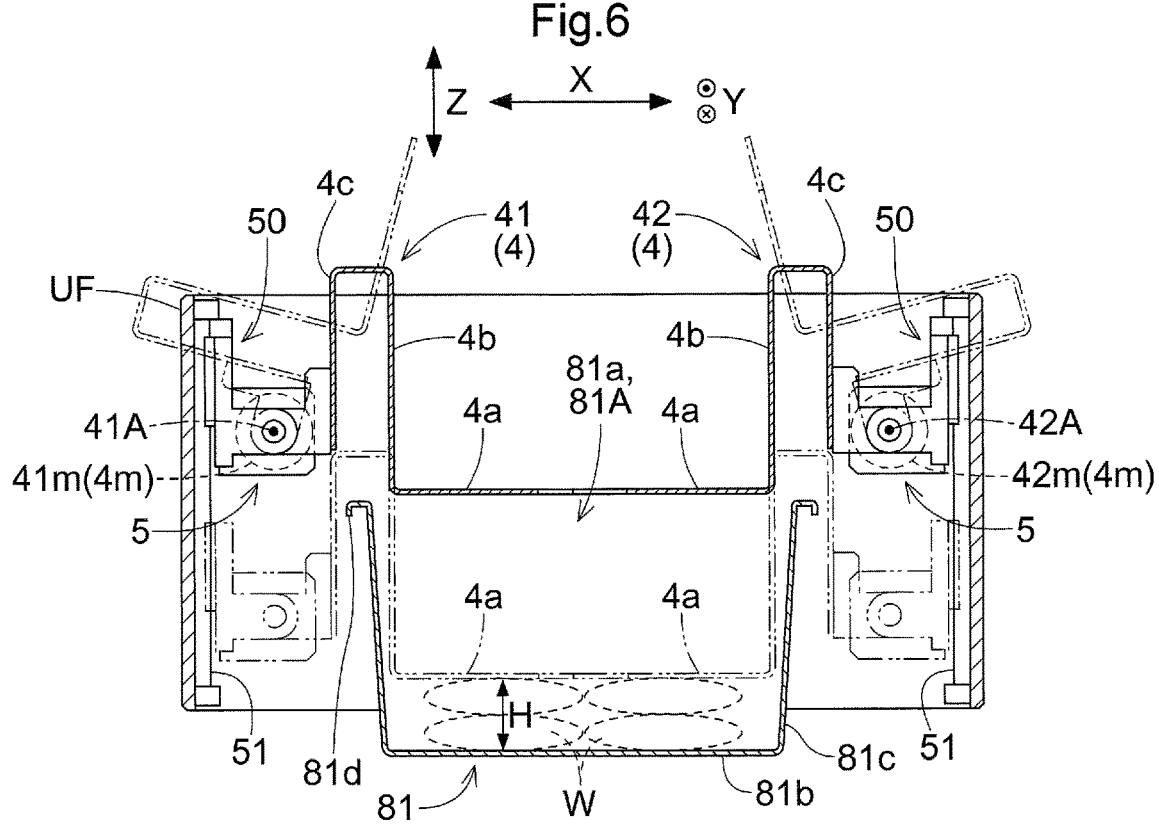
FIG. 6 is a cross-sectional view taken along a line VI-VI in FIG. 4.

As shown in FIGS. 4 to 6, the inter-container transfer apparatus 100 includes: a holding mechanism 1 configured to hold the first container 81, an opening and closing member 4 changeable between (i) a closed state, in which the opening and closing member 4 is arranged in the first opening 81A of the first container 81 held by the holding mechanism 1 to close the first opening 81A, and (ii) an open state of opening the first opening 81A; and an opening and closing drive mechanism 4m configured to drive the opening and closing member 4 to perform an opening/closing operation. In the present embodiment, the inter-container transfer apparatus 100 includes an adjustment mechanism 5 configured to adjust the position of the opening and closing member 4 in the container height direction H relative to the bottom portion 81b of the first container 81.

In the present embodiment, the inter-container transfer apparatus 100 includes a frame body UF on which the holding mechanism 1, the opening and closing member 4, and the adjustment mechanism 5 are supported. The frame body UF surrounds the first container 81 held by the holding mechanism 1 when viewed in the up-down direction Z. In the present embodiment, the frame body UF is tubular such that the inside thereof is open in the up-down direction Z, and is arranged surrounding the first container 81 held by the holding mechanism 1 when viewed in the up-down direction Z. Main portions of the holding mechanism 1, the opening and closing member 4, and the adjustment mechanism 5 are supported on the inner periphery of the frame body UF.

As shown in FIGS. 4 and 5, the holding mechanism 1 includes a pair of holding units 10 that faces each other in the horizontal direction (here, the second direction Y). The pair of holding units 10 are disposed so as to face the outer periphery of the first container 81 arranged inside the frame body UF, from the outer side. The pair of holding units 10 are configured to be advanced and retracted with respect to the first container 81 disposed inside the frame body UF. The pair of holding units 10 hold the first container 81 in the advanced state and release the holding of the first container 81 in the retracted state. In the present embodiment, the pair of holding units 10 in the advanced state hold the first container 81 by holding flange portions 81d formed along the outer edge of the first container 81 from two sides in the up-down direction Z. With this, the pair of holding units 10 can appropriately hold the first container 81 so as to prevent the first container 81 from falling, regardless of whether the first opening 81A of the first container 81 is directed upward or is directed downward (that is, a state in which the positions of the top portion 81a and the bottom portion 81b in the up-down direction Z are inverted).

As shown in FIGS. 4 and 6, the opening and closing member 4 includes: a facing portion 4a extending parallel to the bottom portion 81b of the first container 81 and facing the articles W in the first container 81 while the opening and closing member 4 is in the closed state; an extending portion 4b extending from the facing portion 4a in the container height direction H while the opening and closing member 4 is in the closed state; and a coupling portion 4c coupling the extending portion 4b with the adjustment mechanism 5. Also, the extending portion 4b extends along the inner surface of the side wall portion 81c of the first container 81 in a state in which the facing portion 4a is inside the first container 81. As shown in FIG. 6, in the present embodiment, the opening and closing member 4 includes a first door 41 that swings around a first shaft 41A and a second door 42 that swings around a second shaft 42A. While the first container 81 is held by the holding mechanism 1, the first shaft 41A and the second shaft 42A are respectively arranged on opposite sides of the first container 81 and are parallel to each other. In the present example, the first shaft 41A and the second shaft 42A extend along the second direction Y. The first door 41 and the second door 42 have the same structure. Specifically, the first door 41 and the second door 42 have a configuration in which they are in the reflection symmetry with respect to each other as a whole (but details thereof may be different from each other), with a plane orthogonal to the horizontal direction (here, the first direction X) serving as the symmetry plane. The opening and closing member 4 comes into the closed state when the first door 41 and the second door 42 swing to come close to each other, and the opening and closing member 4 comes into the open state when the first door 41 and the second door 42 swing to separate from each other. Note that the above-described facing portion 4a, extending portion 4b, and coupling portion 4c are provided on each of the first door 41 and the second door 42. Since the first door 41 and the second door 42 have the same structure, the following will mainly describe the first door 41, and a description of the second door 42 will be omitted.

A swing base end of the first door 41 is arranged outside the first container 81 held by the holding mechanism 1. Also, a swing leading end of the first door 41 is arranged inside the first container 81 while the opening and closing member 4 is in the closed state. The swing base end constitutes part of the coupling portion 4c. The swing leading end constitutes a part of the facing portion 4a. A swing leading end of the coupling portion 4c is coupled to the extending portion 4b, and a swing base end of the facing portion 4a is coupled to the extending portion 4b. In other words, a swing base end of the extending portion 4b is coupled to the coupling portion 4c, and a swing leading end of the extending portion 4b is coupled to the facing portion 4a. In the present embodiment, while the opening and closing member 4 is in the closed state, the extending portion 4b and the coupling portion 4c are configured to surround the side wall portion 81c of the first container 81 from two sides in the horizontal direction and from above.

In the present embodiment, the opening and closing drive mechanism 4m includes a first opening and closing drive unit 41m for driving the first door 41 to open and close, and a second opening and closing drive unit 42m for driving the second door 42 to open and close. The first opening and closing drive unit 41m is provided at the swing base end of the first door 41, and is configured to swing the first door 41 around the first shaft 41A. Also, the second opening and closing drive unit 42m is provided at the swing base end of the second door 42, and is configured to swing the second door 42 around the second shaft 42A. For example, an electric motor may be used as each of the first opening and closing drive unit 41m and the second opening and closing drive unit 42m.

As shown in FIG. 6, the adjustment mechanism 5 includes an opening and closing member supporting unit 50 that supports the opening and closing member 4, and a guide unit 51 that guides the opening and closing member supporting unit 50 in the up-down direction Z. The opening and closing member supporting unit 50 and the guide unit 51 are provided on each of the first door 41 and the second door 42. One of the pair of opening and closing member supporting units 50 supports the swing base end of the first door 41. The other one of the pair of opening and closing member supporting units 50 supports the swing base end of the second door 42. The guide units 51 have the shape of a rail extending along the up-down direction Z, and are provided on the inner periphery of the frame body UF. The adjustment mechanism 5 is configured to move, using a not-shown drive unit, the opening and closing member supporting units 50 along the guide units 51. With this, the adjustment mechanism can move the entire opening and closing member 4 in the up-down direction Z, regardless of whether the opening and closing member 4 is in the open state or in the closed state. For example, by moving the opening and closing member 4 in the closed state in the up-down direction Z while the first container 81 is held by the holding mechanism 1 in an orientation in which the container height direction H conforms to the up-down direction Z, the adjustment mechanism 5 adjusts the position of the facing portion 4a of the opening and closing member 4 in the container height direction H while the facing portion 4a faces the articles W in the first container 81. Therefore, as indicated by virtual lines in FIG. 6, the adjustment mechanism 5 can perform a pressing operation of pressing the articles W in the first container 81 in the container height direction H with use of the opening and closing member 4 (facing portions 4a). Note that in the pressing operation, the position of the opening and closing member 4 is adjusted so that the pressure has such an extent that no article W is broken by the pressing operation. Although detailed illustration is omitted, the adjustment mechanism 5 may include, for example, a pressure detection sensor for detecting the pressure applied to the articles W by the opening and closing member 4, and may adjust the position of the opening and closing member 4 in the container height direction H based on a result of detection of the pressure detection sensor.

Figure 7:
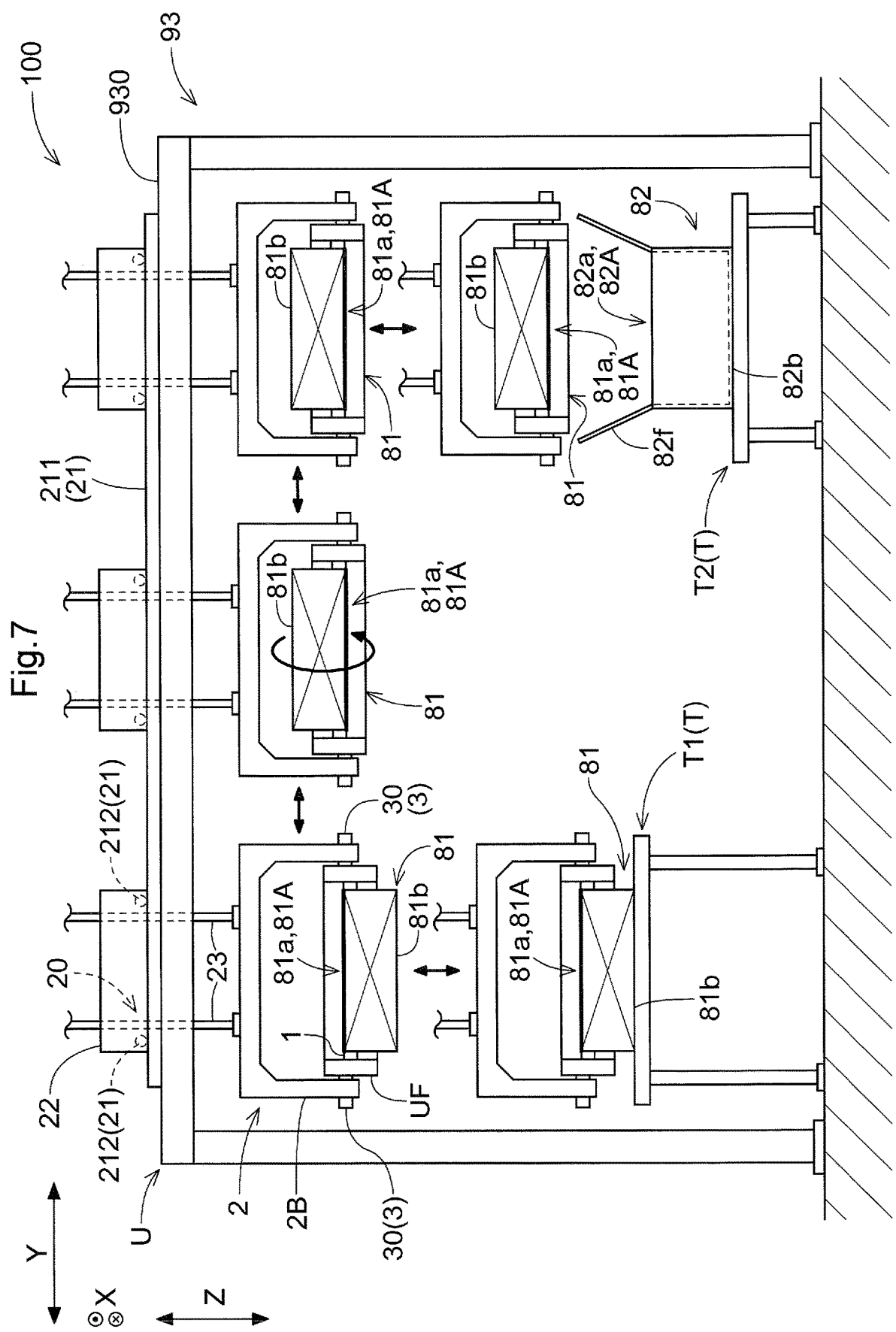
FIG. 7 is diagram viewed in a first direction, illustrating a movement mechanism and an inversion mechanism.

As shown in FIG. 7, the inter-container transfer apparatus 100 includes a movement mechanism 2 configured to move the holding mechanism 1, and an inversion mechanism 3 configured to invert the up-down relationship between the bottom portion 81b and the top portion 81a of the first container 81 held by the holding mechanism 1. Note that in FIG. 7, the structure of the inter-container transfer apparatus 100 is shown in a simplified manner, and for example, illustration of the opening and closing member 4 is omitted.

Although details are omitted, the inversion mechanism 3 is configured to invert the first container 81 held by the holding mechanism 1 with its first opening 81A directed upward, and directs the first opening 81A downward. Also, the movement mechanism 2 is configured to move the holding mechanism 1 so that the first opening 81A directed downward faces the second opening 82A of the second container 82 from above.

The movement mechanism 2 is configured to move the holding mechanism 1 in the up-down direction Z. In the present embodiment, the movement mechanism 2 is configured to move the holding mechanism 1 in the horizontal direction. That is to say, in the present embodiment, the movement mechanism 2 is configured to move the holding mechanism 1 in both the up-down direction Z and the horizontal direction. In the present example, the first conveyance device T1 and the second conveyance device T2 are arranged apart from each other in the second direction Y, and conveying faces thereof are arranged at different heights (see FIG. 7). By moving the holding mechanism 1 in the up-down direction Z and the horizontal direction (here, the second direction Y), the movement mechanism 2 can appropriately move the holding mechanism 1 between the first conveyance device T1 and the second conveyance device T2.

In the present embodiment, the movement mechanism 2 includes a body portion 2B that holds the frame body UF. The movement mechanism 2 is configured to move the frame body UF at least in the up-down direction Z. In the present example, the movement mechanism 2 is configured to move the frame body UF in the horizontal direction. That is to say, in the present example, the movement mechanism 2 is configured to move the frame body UF in both the up-down direction Z and the horizontal direction (here, the second direction Y).

In the present embodiment, the body portion 2B holds the frame body UF via the inversion mechanism 3. The inversion mechanism 3 is configured to rotate the frame body UF. In the present example, the inversion mechanism 3 includes support shafts 30 that are rotatably coupled to the body portion 2B and support the frame body UF, and a rotary drive unit (not shown) for driving and rotating the support shafts 30. The support shafts 30 extend in the horizontal direction, and are configured to rotate the frame body UF around a horizontal axis. In the present example, the support shafts 30 extend in the second direction Y. Therefore, as a result of the support shafts being driven to rotate, the frame body UF rotates around the axis extending in the second direction Y. Note that in the example shown in FIG. 7, the support shafts 30 are provided on respective sides of the frame body UF in the second direction Y. The frame body UF is rotatably held by the pair of support shafts 30 with respect to the body portion 2B.

In the present embodiment, the inter-container transfer apparatus 100 includes a support frame 930 that surrounds the first conveyance device T1 and the second conveyance device T2. The support frame 930 is provided in the assortment area 93.

In the present embodiment, the movement mechanism 2 includes the body portion 2B that holds the frame body UF, a lifting and lowering unit 20 for lifting and lowering the frame body UF, and a travel unit 21 for moving the frame body UF in the second direction Y. In the present example, the movement mechanism 2 includes supported parts 23 standing upright from the body portion 2B to the upper side, and a supporting part 22 that is provided on the support frame 930 and supports the supported parts 23. The supported parts 23 are coupled to the supporting part 22 so as to be movable in the up-down direction Z.

Although detailed illustrations are omitted, the lifting and lowering unit 20 includes a gear mechanism provided in a portion coupling the supporting part 22 with the supported parts 23, and a gear drive unit for driving the gear mechanism. As a result of the gear drive unit driving the gear mechanism, the supported parts 23 are moved in the up-down direction Z with respect to the supporting part 22. With this configuration, the lifting and lowering unit 20 is capable of moving the body portion 2B and the frame body UF in the up-down direction Z. Note that the lifting and lowering unit 20 may be provided with wires, belts, and the like, in place of the above-described gear mechanism. Also, the lifting and lowering unit 20 may be provided with a pulley for driving wires or belts, in place of the above-described gear mechanism.

In the present embodiment, the travel unit 21 includes a travel rail 211 laid on the support frame 930, a plurality of wheels 212 that roll on the travel rail 211, and a travel drive unit (not shown) that drives at least one of the plurality of wheels 212. In the present example, the travel rail 211 extends in the second direction Y. The plurality of wheels 212 are provided on the supporting part 22. With this, the supporting part 22 extends in the second direction Y. As described above, the supporting part 22 supports the supported parts 23 standing upright from the body portion 2B. Accordingly, when the travel unit 21 moves the supporting part 22 in the second direction Y, the body portion 2B and the frame body UF are also moved in the second direction Y. With this configuration, the travel unit 21 is capable of moving the body portion 2B and the frame body UF in the second direction Y.

Note that in the present embodiment, the inter-container transfer apparatus 100 includes two transfer units U including a first transfer unit U1 and a second transfer unit U2 that each include a set of the holding mechanism 1, the movement mechanism 2, the inversion mechanism 3, the opening and closing member 4, and the opening and closing drive mechanism 4*m* (see also FIG. 2). As shown in FIG. 2, the first transfer unit U1 and the second transfer unit U2 are arranged at different positions in the first direction X. The first transfer unit U1 and the second transfer unit U2 are configured to transfer, at different positions in the first direction X, articles W from the first container 81 placed on the first conveyance device T1 to the second container 82 placed on the second conveyance device T2. A transfer operation of transferring articles W using the first transfer unit U1 and the second transfer unit U2 will be described later.

The following will describe a control configuration of the inter-container transfer apparatus 100.

Figure 8:
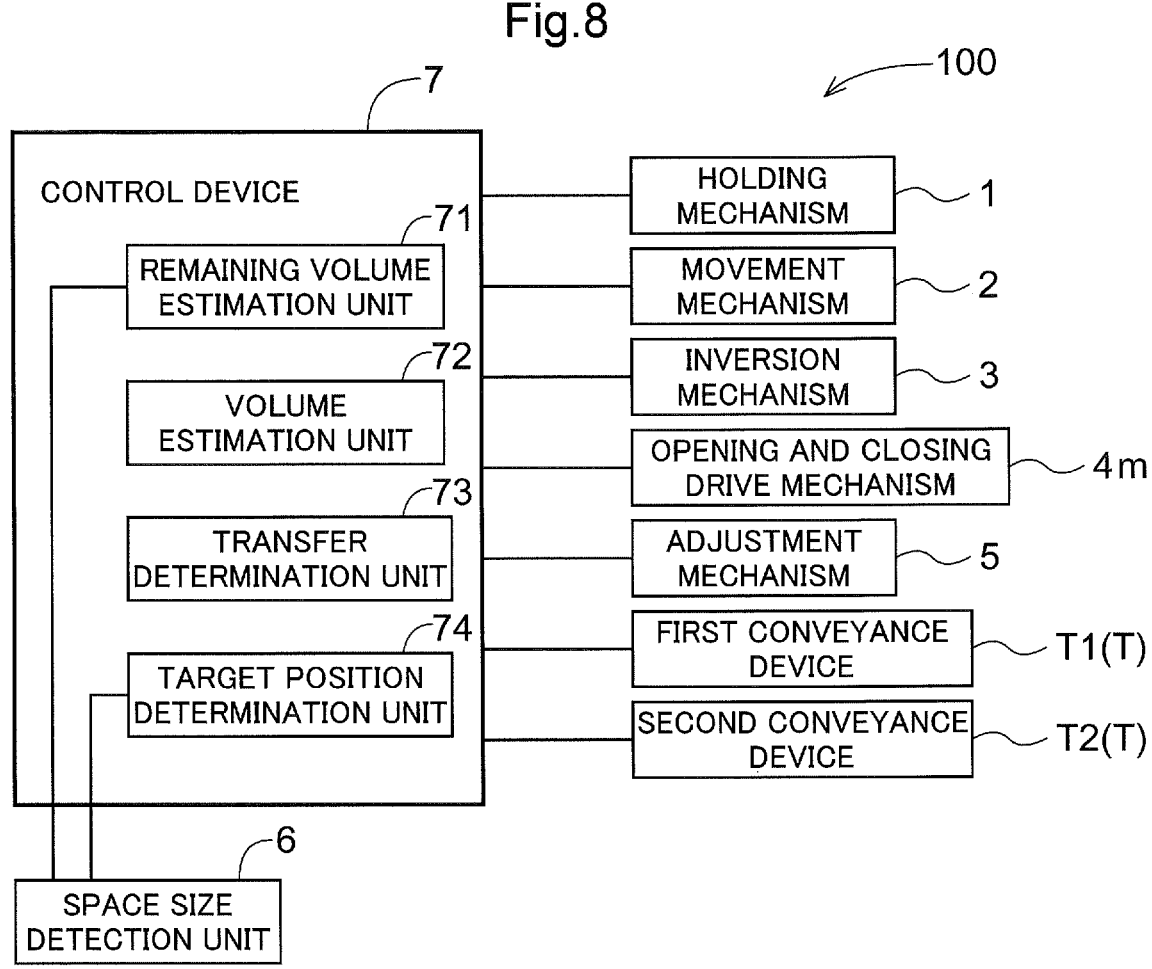
FIG. 8 is a control block diagram.

As shown in FIG. 8, the inter-container transfer apparatus 100 includes a control device 7 for controlling the holding mechanism 1, the movement mechanism 2, the inversion mechanism 3, and the opening and closing drive mechanism 4*m*. In the present embodiment, the control device 7 controls, in addition thereto, the adjustment mechanism 5. In the present embodiment, the control device 7 controls the above-described mechanisms included in each of the first transfer unit U1 and the second transfer unit U2. Also, the control device 7 is configured to control the first conveyance device T1 and the second conveyance device T2. The control device 7 includes, for example, a processor such as a microcomputer, and a peripheral circuit such as a memory. Also, due to the cooperation of the hardware with a program executed on the processor such as a computer, processing and functions are realized.

In the present embodiment, the control device 7 includes: a remaining volume estimation unit 71 for estimating the remaining volume of the second container 82 indicating the volume of the articles W that can be contained; a volume estimation unit 72 for estimating the article volume of articles W contained in the first container 81; and a transfer determination unit 73 for comparing the estimated value estimated by the remaining volume estimation unit 71 and the estimated value estimated by the volume estimation unit 72, and determining whether or not it is possible to transfer the articles W from the first container 81 to the second container 82. Note that the wordings "the volume of articles W contained in the first container 81" refers to the value obtained by summing up the volumes of all of the articles W contained in the first container 81.

In the present embodiment, the control device 7 includes a target position determination unit 74 for determining a target position in the second container 82 to which articles W are to be transferred from the first container 81. As describe above, transfer of articles W from the first container 81 to the second container 82 is performed by dropping the articles W from the first container 81 toward the second container 82. Accordingly, the target position determination unit 74 is configured to determine a drop target position Pt (see FIGS. 10 and 11), which serves as a target for dripping articles W, in the second container 82.

Figure 10:
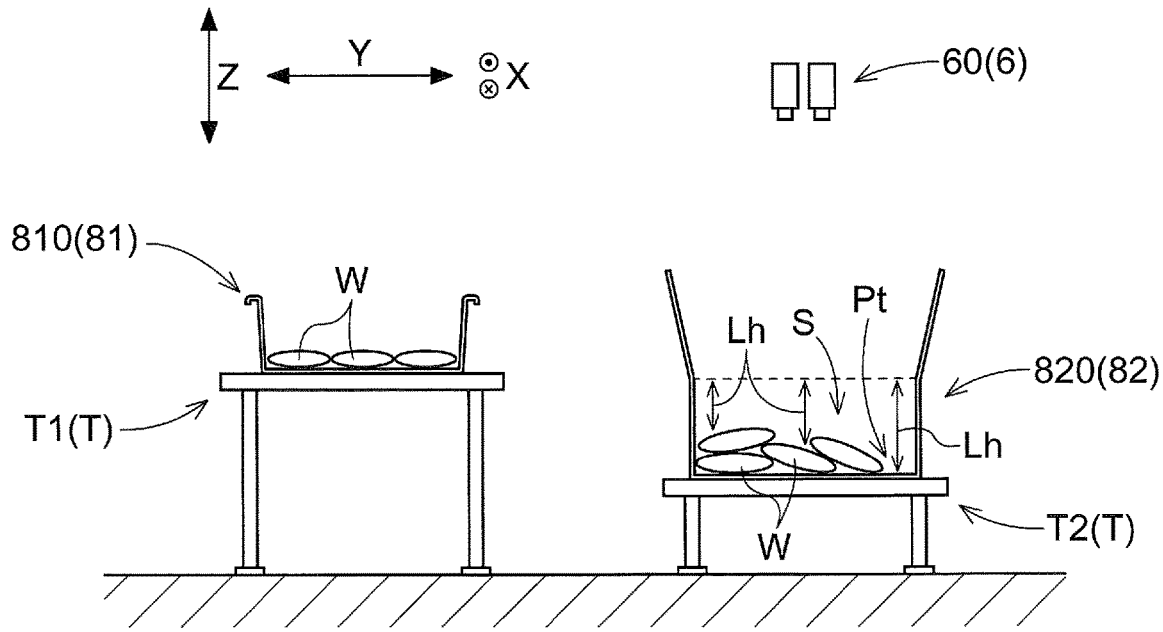
FIG. 10 illustrates a case where a transfer determination step is performed.

In the present embodiment, the inter-container transfer apparatus 100 includes a space size detection unit 6 for detecting the size Lh (see FIG. 10) in the up-down direction Z of an empty space S, which is a space in which no article W is contained, in the second container 82, at a plurality of positions of the second container 82 in the horizontal direction. As shown in FIG. 10, in the present example, the space size detection unit 6 employs a stereo camera 60 capable of detecting the distance to a target. However, the space size detection unit 6 may employ an optical sensor. In this case, a plurality of optical sensors may be arranged at positions in the horizontal direction, or a single optical sensor may be used to scan the entire interior of the second container 82.

In the present embodiment, the remaining volume estimation unit 71 estimates the remaining volume of the second container 82 based on a result of detection by the space size detection unit 6. Specifically, the remaining volume estimation unit 71 estimates the volume of the empty space S based on the size Lh of the empty space S in the up-down direction that was detected by the space size detection unit 6 at a plurality of positions in the horizontal direction. For example, a product of the average of sizes Lh in the up-down direction detected at the plurality of positions, and the area of the second container 82 (specifically, the containing space inside the second container 82) when viewed in the up-down direction can be estimated as the volume of the empty space S. The volume of the empty space S inside the second container 82 can be considered as the remaining volume of the second container 82 indicating the volume of the articles W that can be contained. That is to say, the remaining volume estimation unit 71 estimates the remaining volume of the second container 82 based on the volume of the empty space S.

In the present embodiment, the target position determination unit 74 determines a drop target position Pt based on a result of detection by the space size detection unit 6. Specifically, the target position determination unit 74 determines, as the drop target position Pt, the position of the empty space S having the largest size Lh in the up-down direction detected by the space size detection unit 6. The position of the empty space S having the larger size Lh in the up-down direction can be estimated as a position of the second container 82 at which a smaller number of transferred article W are loaded, or no transferred article W is arranged. Such a position has a room for articles W to be additionally transferred. The target position determination unit 74 determines such a position as the drop target position Pt at which the next article W is to be dropped.

Figure 9A:
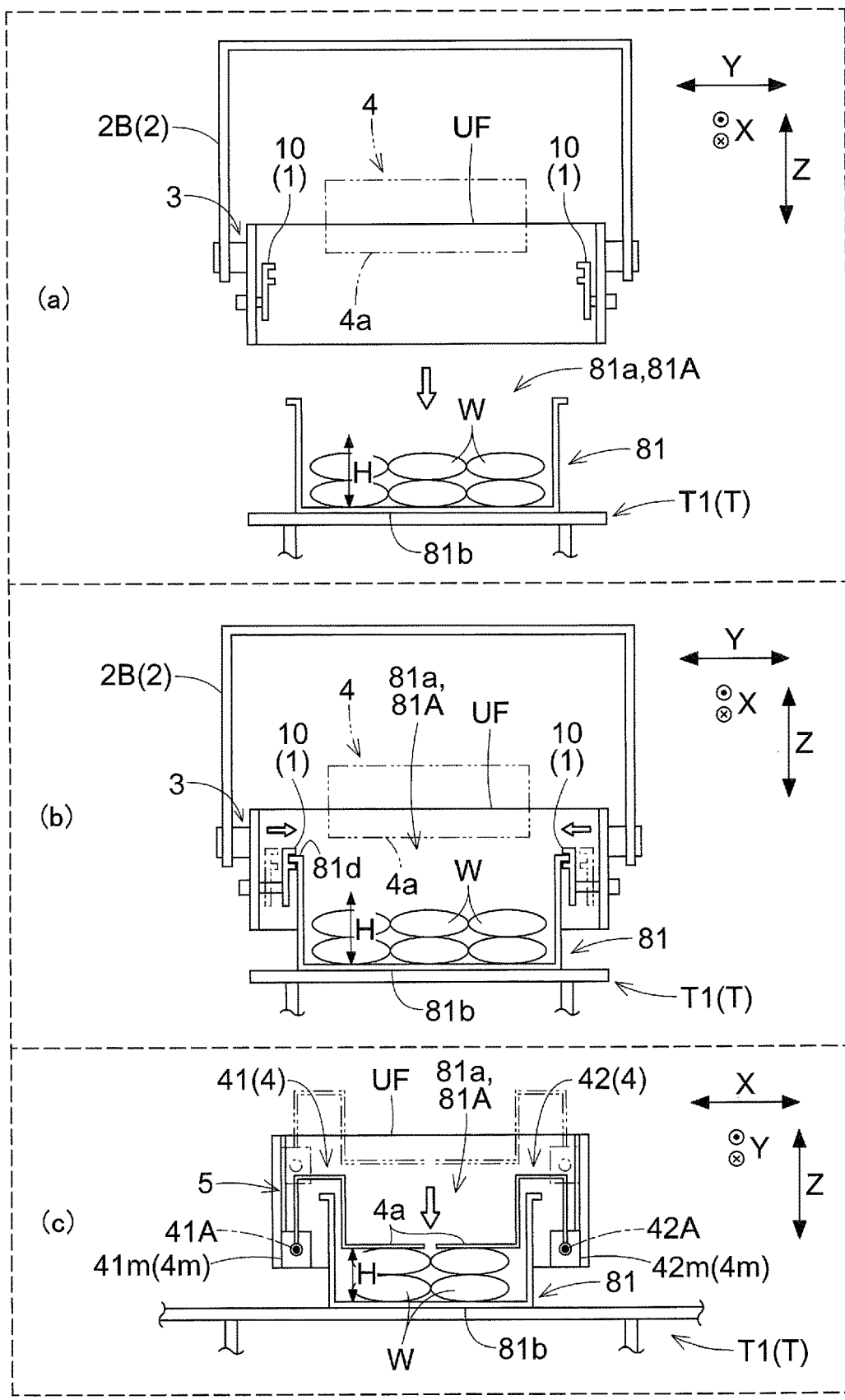
FIG. 9A illustrates a transfer operation of transferring articles.
Figure 9B:
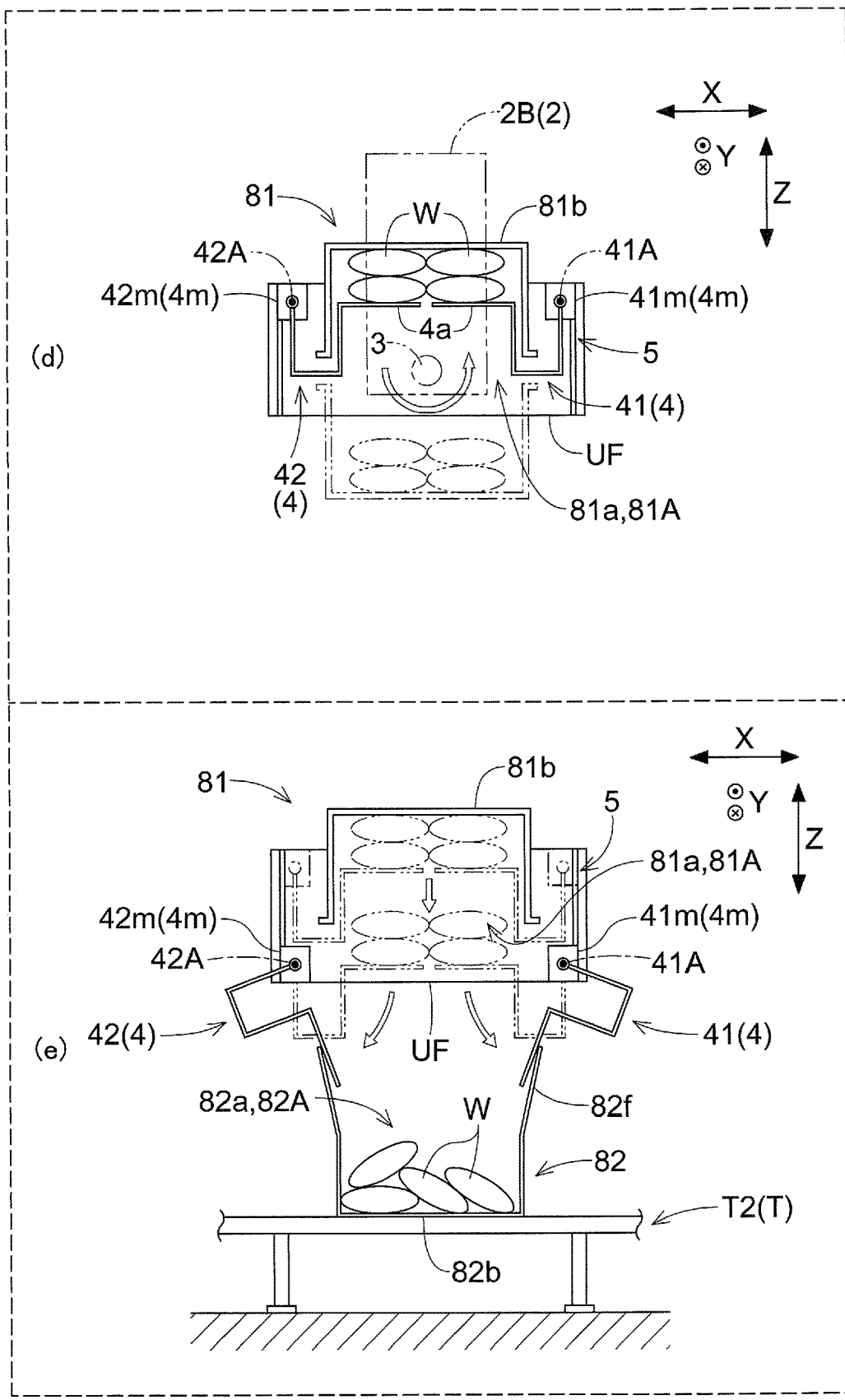
FIG. 9B illustrates the transfer operation of transferring articles.

FIGS. 9A and 9B show a transfer operation of transferring articles W from the first container 81 to the second container 82. In FIGS. 9A and 9B, the transfer operation is performed in the order of (a), (b), (c), (d), and (e). Note that (a) and (b) in FIG. 9A show the transfer operation when viewed in the first direction X. (C) in FIG. 9A, and (d) and (e) in FIG. 9B show the transfer operation when viewed in the second direction Y.

As shown in FIG. 9A, the movement mechanism 2 brings the holding mechanism 1 close to the first container 81 placed on the first conveyance device T1 from above (a) so that the holding mechanism 1 faces the first container 81, and disposes the opening and closing member 4 (here, the opening and closing member 4 in the closed state) in the first opening 81A (b). The holding mechanism 1 holds the first container 81 in which the articles W are contained with the first opening 81A directed upward (b). The holding mechanism 1 holds, using the protruded holding units 10, the flange portions 81d of the first container 81 (b). The adjustment mechanism 5 performs a pressing operation of pressing the articles W in the first container 81 in the container height direction H with use of the opening and closing member 4 in the closed state (c). Also, the movement mechanism 2 moves the holding mechanism 1 toward the second conveyance device T2.

As shown in FIG. 9B, while the holding mechanism 1 is being moved by the movement mechanism 2, the inversion mechanism 3 inverts the first container 81 held by the holding mechanism 1 with the first opening 81A directed upward, and directs the first opening 81A downward (d). With this, the articles W in the first container 81 are brought, from the state of being supported by the bottom portion 81b of the first container 81 from below, into the state of being supported by the opening and closing member 4 from below. The opening and closing drive mechanism 4m closes the opening and closing member 4 while the holding mechanism 1 is being inverted by the inversion mechanism 3 and the holding mechanism 1 is being moved by the movement mechanism 2 (d). At least while the holding mechanism 1 is being inverted by the inversion mechanism 3, the adjustment mechanism 5 performs the pressing operation of pressing the articles W in the first container 81 in the container height direction H with use of the opening and closing member 4 in the closed state. In other words, at least while the holding mechanism 1 is being inverted by the inversion mechanism 3, the adjustment mechanism 5 keeps pressing the articles W in the first container 81 in the container height direction H. This makes it possible to suppress movement of the articles W within the first container 81, when the first container 81 is inverted by the inversion mechanism 3.

The movement mechanism 2 moves the holding mechanism 1 so that the first opening 81A of the first container 81 directed downward faces the second opening 82A of the second container 82 from above (e). The movement mechanism 4m opens the opening and closing member 4 in response to the downward directed first opening 81A of the first container 81 facing the second opening 82A of the second container 82 (e). As a result of the opening and closing member 4 being open, the articles W supported by the opening and closing member 4 from below are dropped into the second container 82. In the present embodiment, the first door 41, which swings around the first shaft 41A from the closed state into the open state, and the second door 42, which swings around the second shaft 42A from the closed state into the open state, are configured to press the flaps 82f in a direction in which the second opening 82A is open, in response to the first opening 81A of the first container 81 facing the second opening 82A of the second container 82 (e). With this, the flaps 82f can be pressed so as to retract from the fall path for the articles W. Accordingly, it is possible to avoid such a situation that the flaps 82f prevent the transfer of the articles W. As described above, the inter-container transfer apparatus 100 transfers all the articles W in the first container 81 to the second container 82. Note that although details are omitted, a sensor (for example, an optical sensor) for detecting protrusion of articles W from the first container 81 may be provided on the frame body UF. For example, a configuration is also possible in which if, during a period from the start of the transfer operation of transferring the articles W from the first container 81 to the second container 82 to the state change of the opening and closing member 4 from the closed state to the open state, protrusion of articles W from the first container 81 is detected by that sensor, the control device 7 will stop the transfer operation of transferring the articles W from the first container 81 to the second container 82, and will perform abnormality notification (for an operator using, for example, sound or light).

Here, depending on the order information, there may be cases where articles W (set of articles) are transferred from a plurality of first containers 81 to one second container 82. That is to say, the above-described transfer operation may be performed repeatedly on one second container 82.

As shown in FIG. 10, in the present embodiment, when articles W contained in a plurality of first containers 81 are to be transferred to at least one second container 82, the control device 7 estimates, each time the articles W are transferred from a first container 81 to a target second container 820, which is a second container 82 serving as a target of transfer, the remaining volume of the target second container 820 indicating the volume of the articles W that can be contained. Also, the control device 7 compares the article volume of articles W contained in a planned first container 810, which is a first container 81 from which articles W are planned to be transferred to the target second container 820, with the remaining volume of the target second container 820. In response to the article volume being smaller than the remaining volume, the control device 7 performs transfer of the articles W from the planned first container 810 to the target second container 820, and in response to the article volume being greater than the remaining volume, the control device 7 performs transfer of the articles W from the planned first container 810 to another second container 82. With this, it is possible to transfer articles W to the second container 82 efficiently using the volume of the second container 82. Also, it is possible to prevent excessive transfer to the second container 82, and avoid such a situation that the transferred articles W protrude from the second container 82.

In the present embodiment, the control device 7 estimates the remaining volume of the second container 82 using the remaining volume estimation unit 71 (see FIG. 8). As described above, the remaining volume estimation unit 71 estimates the volume of the empty space S based on the size Lh of the empty space S in the up-down direction that was detected by the space size detection unit 6 at a plurality of positions in the horizontal direction. The volume of the empty space S inside the second container 82 can be considered as the remaining volume of the second container 82 indicating the volume of the articles W that can be contained. That is to say, the remaining volume estimation unit 71 estimates the remaining volume of the second container 82 based on the volume of the empty space S.

In the present embodiment, the control device 7 compares, using the transfer determination unit 73 (see FIG. 8), the article volume of the articles W contained in the planned first container 810 with the remaining volume of the target second container 820, and determines whether or not it is possible to transfer the articles W from the planned first container 810 to the target second container 820. The transfer determination unit 73 determines it is possible to transfer the articles if the article volume is smaller than the remaining volume, and determines it is not possible to transfer the articles if the article volume is greater than the remaining volume.

Figure 11:
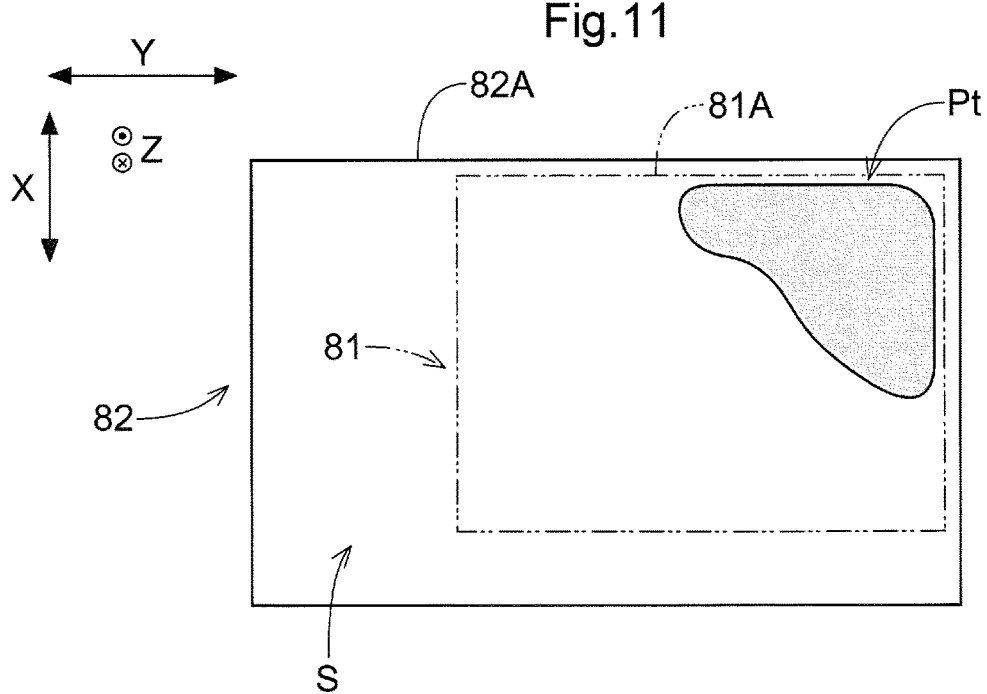
FIG. 11 illustrates a case where a movement step based on a drop target position is performed.

As shown in FIGS. 10 and 11, in the present embodiment, when articles W contained in a plurality of first containers 81 are to be transferred to at least one second container 82, the control device 7 determines, each time the articles W are transferred from the planned first container 810 to the target second container 820, the drop target position Pt in the target second container 820 at which the next article W is to be dropped.

In the present embodiment, the control device 7 determines the drop target position Pt using the target position determination unit 74 (see FIG. 8). As described above, the target position determination unit 74 determines, as the drop target position Pt, the position of the empty space S having the largest size Lh in the up-down direction detected by the space size detection unit 6. The position of the empty space S having the larger size Lh in the up-down direction can be estimated as a position of the second container 82 at which a smaller number of transferred article W are loaded, or no transferred article W is arranged. Such a position has a room for articles W to be additionally transferred. The target position determination unit 74 determines such a position as the drop target position Pt at which the next article W is to be dropped. Note that the "drop target position Pt" may refer to a point or a certain area. In the example shown in FIG. 11, a certain area is determined as the drop target position Pt.

As shown in FIG. 11, in the present embodiment, the control device 7 controls the movement mechanism 2 to dispose the first container 81 above the second container 82 so that the drop target position Pt overlaps with the first opening 81A when viewed in the up-down direction. Then, in response to the drop target position Pt overlapping with the first opening 81A when viewed in the up-down direction, the control device 7 controls the opening and closing drive mechanism 4*m* to bring the opening and closing member 4 into the open state. That is to say, in the present embodiment, in response to the position (drop target position Pt) of the empty space S having the largest size Lh in the up-down direction Z detected by the space size detection unit 6 overlapping with the first opening 81A when viewed from above, the control device 7 brings the opening and closing member 4 into the open state. With this, it is possible to arrange the articles W to be dropped from the first container 81 at the drop target position Pt of the empty space S having the largest size Lh in the up-down direction Z, or the area in the vicinity thereof. Accordingly, when articles W contained in a plurality of first containers 81 are to be transferred to at least one second container 82, the articles W can easily be arranged in the second container 82 in a balanced manner. Note that, in order to make it easy to arrange a plurality of articles W in the second container 82 in a balanced manner, a configuration is also possible in which the second conveyance device T2 includes a shaking mechanism for shaking the second container 82, and the articles W contained in the second container 82 are evenly distributed by shaking the second container 82. For example, a configuration is possible in which, each time articles W are transferred to the second container 82, or when the imbalanced distribution of articles W in the second container 82 has been detected as exceeding a predetermined standard, the second container 82 is shaken by the above-described shaking mechanism.

The following will describe an inter-container transfer method for transferring articles W contained in the first containers 81 to the second container 82.

The inter-container transfer method is a method for transferring articles W contained in the first container 81 to the second container 82. In the inter-container transfer method, the inter-container transfer apparatus 100 is used that includes: the holding mechanism 1 configured to hold the first container 81; the movement mechanism 2 configured to move the holding mechanism 1; the inversion mechanism 3 configured to invert the up-down relationship of the bottom portion 81*b* and the top portion 81*a* of the first container 81 held by the holding mechanism 1; the opening and closing member 4 changeable between (i) a closed state, in which it is arranged in the first opening 81A of the first container 81 held by the holding mechanism 1 to close the first opening 81A, and (ii) an open state of opening the first opening 81A; and the opening and closing drive mechanism 4*m* configured to drive the opening and closing member 4 to perform an opening/closing operation.

The inter-container transfer method includes: a first container holding step of holding the first container 81 in which articles W are contained with the first opening 81A directed upward, with use of the holding mechanism 1; an opening and closing member arrangement step of arranging the opening and closing member 4 in the closed state in the first opening 81A of the first container 81; an inversion step of inverting, while the first container 81 is held by the holding mechanism 1 with the first opening 81A directed upward, the first container 81 to direct the first opening 81A downward with use of the inversion mechanism 3, the inversion step being performed after the first container holding step and the opening and closing member arrangement step; a movement step of moving the holding mechanism 1 so that (i) the first container 81 is located above the second container 82, and (ii) the first container 81 and the second container 82 overlap each other when viewed in the up-down direction Z; and a transfer step of bringing the opening and closing member 4 in the closed state into the open state in response to the downward directed first opening 81A facing the second opening 82A from above, and transferring articles W contained in the first container 81 into the second container 82, the transfer step being performed after the inversion step and the movement step.

In the present embodiment, the inter-container transfer method includes a pressing step of pressing the articles W in the first container 81 in the container height direction H with use of the opening and closing member 4, and the transfer step includes: a pressure releasing step of releasing the pressure applied to the articles W by the opening and closing member 4; and an opening step of bringing the opening and closing member 4 into the open state so that the first opening 81A directed downward is open. The inter-container transfer method further includes: a transfer determination step of determining whether or not it is possible to transfer the articles W from the planned first container 810 to the target second container 820; and a second container replacement step of replacing the target second container 820 in which the articles W are contained with an empty second container 82.

Figure 12:
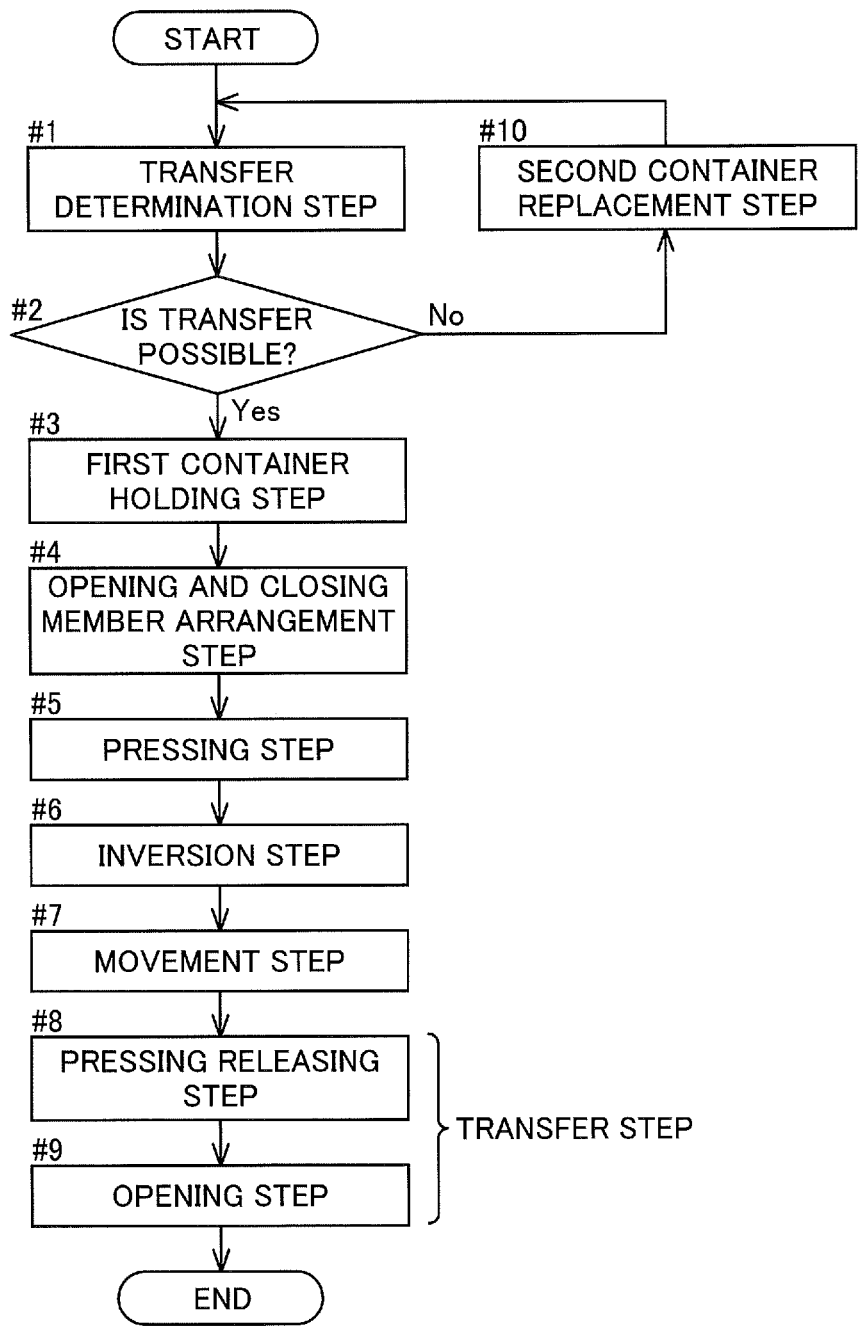
FIG. 12 is a flowchart illustrating a processing procedure when inter-container transfer is performed.

The following will describe the processing procedure in which the inter-container transfer method is executed, with reference to the flowchart in FIG. 12. Note that the steps of the inter-container transfer method is executed by the control device 7 controlling the constituent components of the inter-container transfer apparatus 100.

In the inter-container transfer method, first, the transfer determination step is executed (step #1) and it is determined whether or not it is possible to transfer articles W from the planned first container 810 to the target second container 820 (step #2).

As described above, in the transfer determination step, it is determined whether or not the transfer is possible by comparing the article volume of the articles W contained in the planned first container 810 with the remaining volume of the target second container 820. If the article volume is smaller than the remaining volume, it is determined that the transfer is possible (Yes in step #2). On the other hand, if the article volume is greater than the remaining volume, the second container replacement step is executed in order to transfer the articles W from the planned first container 810 to another second container 82 (step #10), and the procedure returns to the processing in step #1.

If it is determined that the transfer of the articles W from the planned first container 810 to the target second container 820 is possible (Yes in step #2), the first container holding step is executed (step #3). Then, the opening and closing member arrangement step is executed to arrange the opening and closing member 4 in the closed state in the first opening 81A of the first container 81 (step #4). Then, the pressing step is executed to press the articles W in the first container 81 in the container height direction H with use of the opening and closing member 4 (step #5). This pressing step is executed by the adjustment mechanism 5 adjusting the position of the opening and closing member 4 relative to the first container 81.

Then, the inversion step is executed to direct the first opening 81A downward (step #6). Because the pressing step is running at this time, the articles W in the first container 81 are pressed by the opening and closing member 4 against the bottom portion 81b of the first container 81. Accordingly, even during the execution of the inversion step, the articles W are unlikely to move within the first container 81.

Then, the movement step is executed to bring the downward-directed first opening 81A into a state of facing the second opening 82A from above (step #7). In the movement step, as described above, the first container 81 is arranged above the second container 82 so that the drop target position Pt overlaps with the first opening 81A when viewed in the up-down direction.

Then, the pressing releasing step is executed to release the pressure applied to the articles W by the opening and closing member 4 (step #8). Lastly, the opening step is executed to open the first opening 81A (step #9).

With this, the articles W are dropped from the planned first container 810 to the target second container 820, and the inter-container transfer is complete. In the present embodiment, the pressure releasing step and the opening step constitute part of the transfer step. Note that if the first container 81 and the opening and closing member 4 do not interfere with each other, it is also possible to execute the opening step without executing the pressure releasing step.

Meanwhile, FIG. 12 shows an example in which the opening and closing member arrangement step is executed after the first container holding step, but the opening and closing member arrangement step and the first container holding step may be executed in parallel. For example, a configuration is also appropriate in which an operation of arranging the opening and closing member 4 in the closed state in the first opening 81A, and an operation of holding the first container 81 using the holding mechanism 1 are executed in parallel. At this time, the temporal relationship between the start and end of the operations may be freely set. Also, the first container holding step may be executed after the opening and closing member arrangement step. For example, a configuration is also appropriate in which the opening and closing member 4 in the closed state is brought close to the first opening 81A from above, and is arranged in the first opening 81A, and then the first container 81 is held by the holding mechanism 1. Similarly, FIG. 12 shows an example in which the movement step is executed after the inversion step, but the movement step and the inversion step may be executed in parallel. For example, a configuration is also appropriate in which the inversion operation of directing the first opening 81A of the first container 81 downward, and the moving operation of moving the first container 81 so that the first opening 81A faces the second opening 82A are executed in parallel. At this time, the temporal relationship between the start and end of the operations may be freely set. Also, the inversion step may be executed after the movement step.

Here, as described above, the inter-container transfer apparatus 100 includes two transfer units U including a first transfer unit U1 and a second transfer unit U2 that each include a set of the holding mechanism 1, the movement mechanism 2, the inversion mechanism 3, the opening and closing member 4, and the opening and closing drive mechanism 4m. The movement mechanisms 2 of the first transfer unit U1 and the second transfer unit U2 are configured to move the corresponding holding mechanism 1 in the up-down direction Z and the second direction Y. That is to say, the first transfer unit U1 and the second transfer unit U2 can move the first container 81 between the first conveyance device T1 and the second conveyance device T2 disposed apart from each other in the second direction Y, and can transfer the articles W contained in the first container 81 to the second container 82. In the present embodiment, the inter-container transfer apparatus 100 transfers articles W from the first container 81 to the second container 82, using the first transfer unit U1 and the second transfer unit U2.

Figure 13A:
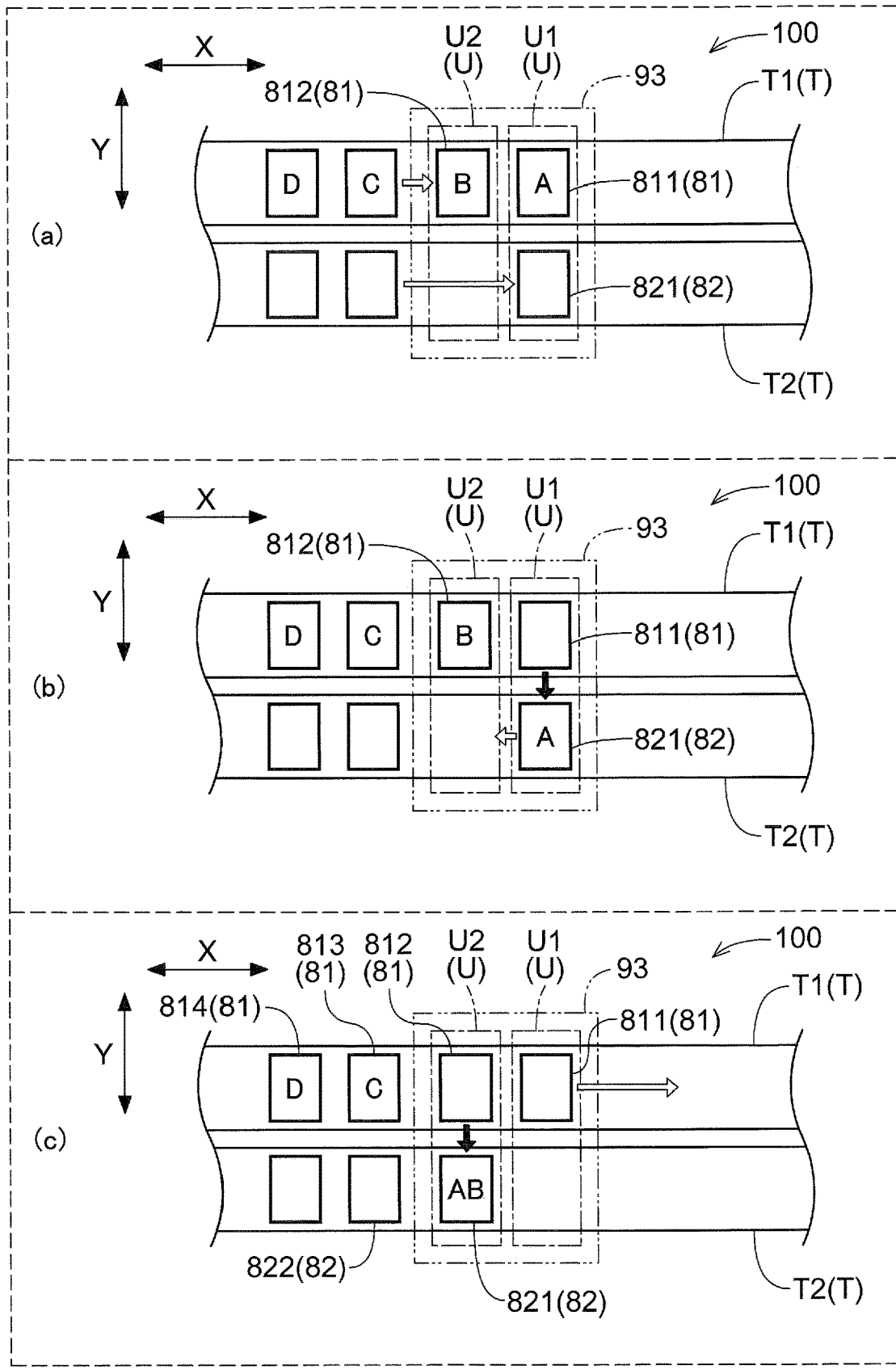
FIG. 13A illustrates a case where a transfer operation is performed by two transfer units.
Figure 13B:
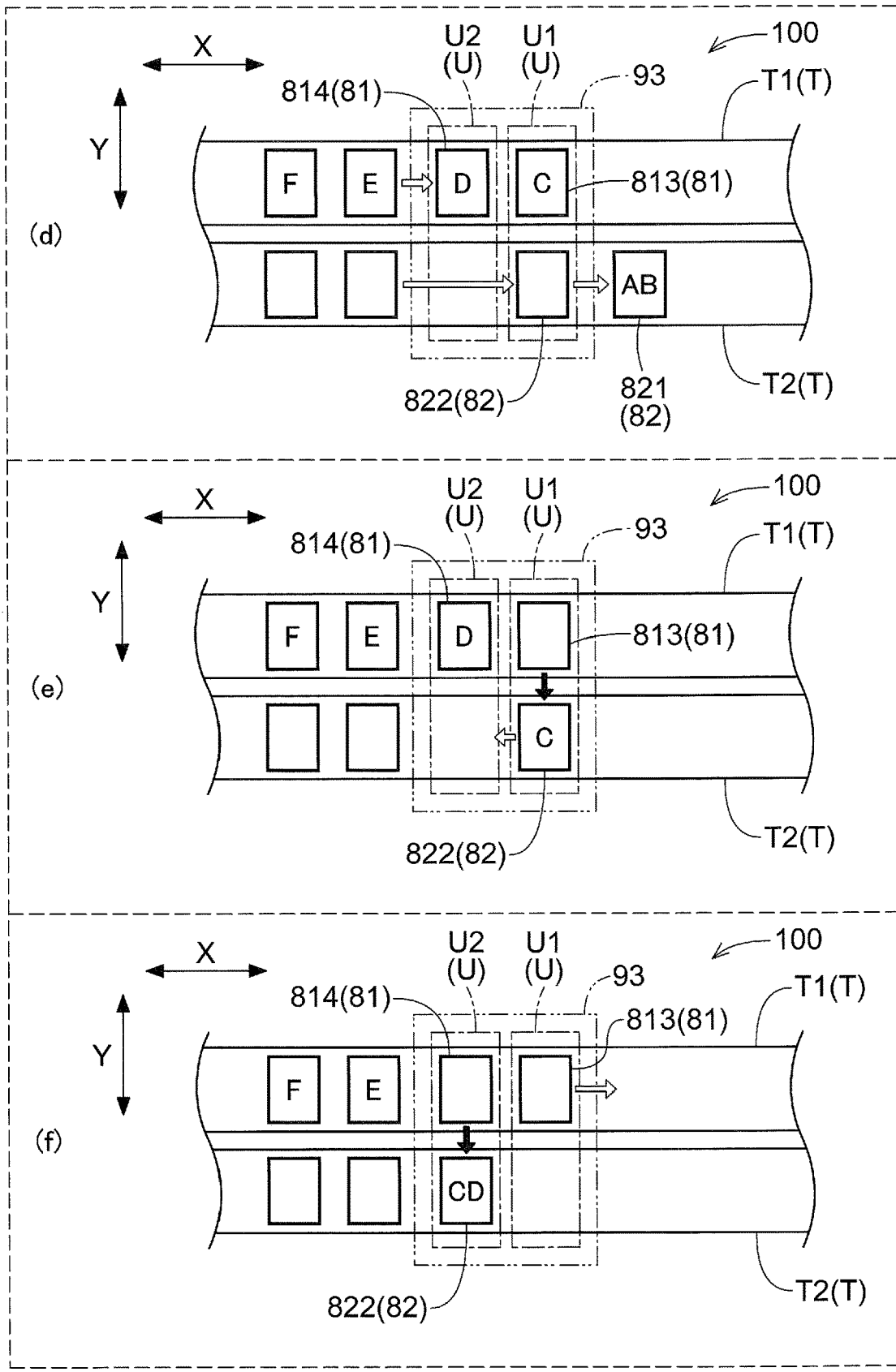
FIG. 13B illustrates a case where a transfer operation is performed by the two transfer units.

FIGS. 13A and 13B illustrate a case where articles W are transferred by the first transfer unit U1 and the second transfer unit U2. In the drawings, alphabetical letters given in the containers (the first container 81 and the second container 82) indicate the types of articles W. However, it is assumed that a container contains a plurality of articles W of the same type. Assuming that articles A, B, C, and D constitute one ordered article set, a transfer operation of transferring the ordered article set to the second container 82 will be described.

The first conveyance device T1 conveys a plurality of first containers 81 in the first direction X. Also, the second conveyance device T2 conveys a plurality of second containers 82 in the first direction X. Hereinafter, for ease of description, the plurality of first containers 81 are referred to as a 1st first container 811 to a Nth (where N is an integer) first container 81N in order, from the downstream side toward the upstream side. Also, the plurality of second containers 82 are referred to as a 1st second container 821 to a Nth (where N is an integer) second container 82N in order, from the downstream side toward the upstream side.

As shown in FIG. 13A(a), the first conveyance device T1 brings the 1st first container 811 and the 2nd first container 812 into the assortment area 93. In the example shown in the drawing, the 1st first container 811 contains a plurality of articles A, and the 2nd first container 812 contains a plurality of articles B. Also, the second conveyance device T2 brings the 1st second container 821 into the assortment area 93. With this, the 1st first container 811 and the 2nd first container 812 are arranged on the first conveyance device T1 at different positions in the first direction X, and the 1st second container 821 is aligned with the 1st first container 811 in the second direction Y.

As shown in FIG. 13A(b), in the present embodiment, in response to the 1st first container 811 and the 2nd first container 812 being arranged on the first conveyance device T1 at different positions in the first direction X, and the 1st second container 821 being aligned with the 1st first container 811 in the second direction Y, the first transfer unit U1 transfers the articles A from the 1st first container 811 to the 1st second container 821. With this, the plurality of articles A are contained in the 1st second container 821. Then, the second conveyance device T2 moves the 1st second container 821 to a position at which it is to be aligned with the 2nd first container 812 in the second direction Y.

Also, as shown in FIG. 13A(c), the second transfer unit U2 transfers the articles B from the 2nd first container 812 to the 1st second container 821. With this, a state is realized in which the plurality of articles A and the plurality of articles B are contained in the 1st second container 821. In this way, by alternately operating the two transfer units U, it is possible to efficiently transfer articles W (articles A and articles B) from a plurality of first containers 81 to one second container 82. Also, at this time, the movement of the second container 82 based on the positions of two first containers 81 can be performed by the second conveyance device T2. Therefore, the configuration of the inter-container transfer apparatus 100 can easily be simplified. Furthermore, for example, by performing, during the transfer of the articles A from the 1st first container 811 to the 1st second container 821 by the first transfer unit U1, a preparation operation of preparing for transfer of the articles B by the second transfer unit U2 (e.g., an operation up to the inversion step in FIG. 12 that is performed on the 2nd first container 812, or an operation up to the midway point of the movement step), it is possible to transfer the articles W more efficiently.

Here, it is preferable for one second container 82 to contain all the articles of the ordered article set, but there may be cases where due to too many articles W constituting the ordered article set, one second container 82 cannot contain all the articles W. In such a case, the inter-container transfer apparatus 100 executes the second container replacement step of conveying a second container 82 full of articles W out of the assortment area 93, and conveying a new second container 82 into the assortment area 93. Then, the inter-container transfer apparatus 100 performs the above-described transfer operation on the new second container 82, using the first transfer unit U1 and the second transfer unit U2. With this, the remaining articles of the ordered article set are transferred to the new second container 82.

As shown in, for example, FIG. 13A(c), when the 1st second container 821 is full of articles A and articles B, any more article W cannot be transferred to the 1st second container 821. The determination of whether or not it is possible to transfer articles W to the 1st second container 821 is made by the above-described transfer determination step.

As shown in FIG. 13B(d), the second conveyance device T2 discharges the 1st second container 821 full of articles W (articles A and articles B) from the assortment area 93, and disposes the 2nd second container 822 in the assortment area 93. The first conveyance device T1 also disposes a 3rd first container 813 and a 4th first container 814 in the assortment area 93. In the example shown in the drawing, the 3rd first container 813 contains a plurality of articles C, and the 4th first container 814 contains a plurality of articles D. With this, a state is realized in which (i) the 3rd first container 813 and the 4th first container 814 are at different positions in the first direction X on the first conveyance device T1, and (ii) the 2nd second container 822 is aligned with the 3rd first container 813 in the second direction Y.

As shown in FIG. 13B(e), in the present embodiment, in response to the 3rd first container 813 and the 4th first container 814 being arranged on the first conveyance device T1 at different positions in the first direction X, and the 2nd second container 822 being aligned with the 3rd first container 813 in the second direction Y, the first transfer unit U1 transfers the articles C from the 3rd first container 813 to the 2nd second container 822. With this, the plurality of articles C are contained in the 2nd second container 822. Then, the second conveyance device T2 moves the 2nd second container 822 to a position at which it is to be aligned with the 4th first container 814 in the second direction Y.

Also, as shown in FIG. 13B(f), the second transfer unit U2 transfers the articles D from the 4th first container 814 to the 2nd second container 822. With this, the remaining articles of the ordered article set are transferred to the 2nd second container 822 that was newly conveyed. Thereafter, the 2nd second container 822 is conveyed out of the assortment area 93 by the second conveyance device T2, and is conveyed toward the shipment area 94 (see FIG. 1), which is a destination.

According to the above-described inter-container transfer apparatus and inter-container transfer method, the first container 81 in which articles W are contained is arranged above the second container 82 so that the first opening 81A directed downward faces the second opening 82A directed upward. By opening the opening and closing member 4 in this state, it is possible to transfer the articles W from the first container 81 to the second container 82. With this, when a plurality of articles W are contained in the first container 81, the plurality of articles W together can be transferred to the second container 82. Accordingly, it is possible to increase the efficiency of transfer of articles W. Also, according to the inter-container transfer apparatus and the inter-container transfer method, in order to achieve the state in which the first opening 81A directed downward faces the second opening 82A directed upward, the up-down relationship between the bottom portion 81$b$ and the top portion 81$a$ of the first container 81 is inverted by the inversion mechanism 3. Arranging the opening and closing member 4 in the closed state in the first opening 81A can avoid articles W from falling from the first container 81, and can suppress imbalanced distribution of the articles W in the first container 81. Thereafter, it is thus possible to appropriately transfer the articles W to the second container 82.

Also, according to the above-described inter-container transfer apparatus and inter-container transfer method, by, instead of directly holding articles W, holding and inverting the first container 81 in which the articles W are contained, the articles W are transferred between the containers. Accordingly, it is possible to appropriately transfer articles between the containers, even when the articles to be transferred have characteristics that they are difficult to be directly held as single articles. Examples of such articles include articles in the shape that they are difficult to be held by robot hands, and articles difficult to be recognized by a camera or the like. That is to say, a versatile inter-container transfer apparatus and a versatile inter-container transfer method can be realized.

Other Embodiments

Hereinafter, other embodiments of the inter-container transfer apparatus and the inter-container transfer method will be described.

(1) In the above-described embodiment, an example has been described in which the inter-container transfer apparatus 100 includes two transfer units U including the first transfer unit U1 and the second transfer unit U2. However, the present invention is not limited to this example, and the inter-container transfer apparatus 100 may include only one transfer unit U, or three or more transfer units U.

(2) In the above-described embodiment, an example has been described in which the inversion mechanism 3 inverts the first container 81 so that the first opening 81A is directed downward while the holding mechanism 1 is moved by the movement mechanism 2 (from the first conveyance device T1 to the second conveyance device T2). However, the present invention is not limited to this example, and the inversion mechanism 3 may invert the first container 81 before or after the movement of the holding mechanism 1 by the movement mechanism 2. That is to say, the inversion step and the movement step may be executed in parallel, or one of the steps may be executed after the completion of the other step.

(3) In the present embodiment, an example has been described in which the article volume of the articles W contained in the planned first container 810 is compared with the remaining volume of the target second container 820, and it is determined whether or not it is possible to transfer the articles W from the planned first container 810 to the target second container 820. In addition to or instead of the comparison between the article volume and the remaining volume, this transfer determination step may be executed using a protrusion detection sensor for detecting protrusion of articles W from the second container 82. If the protrusion detection sensor detects protrusion of articles W from the target second container 820, it is determined that transfer of articles W from the planned first container 810 to the target second container 820 is not possible. That is to say, the inter-container transfer apparatus 100 includes the protrusion detection sensor for detecting protrusion of articles W from the second container 82, and if protrusion of articles W from the second container 82 has been detected by the protrusion detection sensor, the control device 7 determines that transfer of articles W from the first container 81 to the second container 82 is not possible, and if no protrusion of articles W from the second container 82 has been detected by the protrusion detection sensor, the control device 7 determines that transfer of articles W from the first container 81 to the second container 82 is possible. Note that a well-known sensor can be used as the protrusion detection sensor, and for example, an optical sensor may be used as the protrusion detection sensor.

(4) In the above-described embodiment, an example has been described in which the remaining volume estimation unit 71 estimates the volume of the empty space S based on the size Lh of the empty space S in the up-down direction that was detected by the space size detection unit 6 at a plurality of positions in the horizontal direction, and estimates the remaining volume of the second container 82 based thereon. However, the present invention is not limited to this example, and a configuration is also possible in which the space size detection unit 6 detects the size Lh in the up-down direction at one position (e.g., the central position of the second container 82 when viewed from above), and the remaining volume estimation unit 71 estimates the volume of the empty space S based on the size Lh in the up-down direction detected at this position. Also, the remaining volume estimation unit 71 may estimate the remaining volume of the second container 82 using image recognition based on an image shot by the space size detection unit 6 serving as a camera. Alternatively, the remaining volume estimation unit 71 may estimate the remaining volume of the second container 82 by subtracting the article volume of articles W already contained in the second container 82 from the known volume of the second container 82.

(5) In the present embodiment, an example has been described in which the movement mechanism 2 is configured to move the holding mechanism 1 in both the up-down direction Z and the horizontal direction. However, the present invention is not limited to this example, and the movement mechanism 2 may be configured to move the holding mechanism 1 only in the up-down direction Z. For example, when a first container 81 and a second container 82 serving as a destination of transfer of articles W contained in the first container 81 are sequentially conveyed on the same conveyance route, the holding mechanism 1 is arranged so that it overlaps this conveyance route when viewed from above. By moving the holding mechanism 1 only in the up-down direction Z, the movement mechanism 2 can arrange the first container 81 above the second container 82. Then, similar to the above-described embodiment, by inverting the first container 81, and opening the opening and closing member 4, it is possible to transfer the articles W from the first container 81 to the second container 82. Also, in contrast to the above-described idea, the direction in which the movement mechanism 2 moves the holding mechanism 1 is not limited to the up-down direction Z and the second direction Y, and the movement mechanism 2 can move the holding mechanism 1 also in the first direction X.

(6) In the present embodiment, an example has been described in which the inter-container transfer apparatus 100 includes the adjustment mechanism 5 configured to adjust the position of the opening and closing member 4 in the container height direction H relative to the bottom portion 81b of the first container 81. However, the adjustment mechanism 5 is not an essential constituent component, and the inter-container transfer apparatus 100 does not need to include such an adjustment mechanism 5.

(7) In the above-described embodiment, an example has been described in which the opening and closing member 4 includes: a facing portion 4a that is arranged parallel to the bottom portion 81b of the first container 81 and faces the articles W in the first container 81 while the opening and closing member 4 is in the closed state; an extending portion 4b extending from the facing portion 4a in the container height direction H while the opening and closing member 4 is in the closed state; and a coupling portion 4c coupling the extending portion 4b with the adjustment mechanism 5. However, the present invention is not limited to this example, and the opening and closing member 4 does not need to include the extending portion 4b and the coupling portion 4c, as long as it includes the facing portion 4a. Also, the opening and closing member 4 may have any of various shapes.

(8) In the present embodiment, an example has been described in which the opening and closing member 4 includes a pair of doors including the first door 41, which swings around the first shaft 41A, and the second door 42, which swings around the second shaft 42A. However, the present invention is not limited to this example, and the opening and closing member 4 may include one swingable door. Also, when the opening and closing member 4 includes one door or a pair of doors, the door or the pair of doors may be configured to slide in the horizontal direction.

(9) In the present embodiment, an example has been described in which the second container 82 is a carton container having the flaps 82f that close the second opening 82A. However, the present invention is not limited to this example, and the second container 82 may be, for example, a resin container similar to the first container 81. In contrast, the first container 81 may be a carton container.

(10) Note that the configurations disclosed in the above-described embodiments may be applied in combination with configurations disclosed in other embodiments as long as no contradiction arises. With respect to other configurations, the embodiments disclosed in this specification are merely examples in all aspects. Accordingly, various modifications are possible, as appropriate, without departing from the spirit of this disclosure.

Overview of the Embodiments

Hereinafter, the above-described inter-container transfer apparatus and inter-container transfer method will be described.

An inter-container transfer apparatus according to the present disclosure relates to an inter-container transfer apparatus for transferring articles contained in a first container to a second container,
 wherein the first container has a bottom portion that is closed, and a top portion that is a first opening,
 the second container has a bottom portion that is closed, and a top portion that is a second opening,
 the inter-container transfer apparatus includes:
  a holding mechanism configured to hold the first container;
  a movement mechanism configured to move the holding mechanism;
  an inversion mechanism configured to invert an up-down relationship between the bottom portion and the top portion of the first container held by the holding mechanism;
  an opening and closing member changeable between (i) a closed state, in which the opening and closing member is arranged in the first opening of the first container to close the first opening, and (ii) an open state of opening the first opening; and
  an opening and closing drive mechanism configured to drive the opening and closing member to perform an opening/closing operation,
 while the first container is held by the holding mechanism with the first opening directed upward, the inversion mechanism inverts the first container to direct the first opening downward,
 the movement mechanism moves the holding mechanism so that (i) the first container is located above the second container, and (ii) the first container and the second container overlap each other when viewed in an up-down direction, and
 the opening and closing drive mechanism brings the opening and closing member into the closed state while the holding mechanism is being inverted by the inversion mechanism and while the holding mechanism is being moved by the movement mechanism, and brings the opening and closing member into the open state in response to the downward-directed first opening facing the second opening from above.

According to the present configuration, the first container in which articles are contained is arranged above the second container so that the downward-directed first opening faces the upward-directed second opening. By opening the opening and closing member in this state, it is possible to transfer the articles from the first container to the second container. With this, when a plurality of articles are contained in the first container, the plurality of articles W can be together transferred to the second container. Accordingly, it is possible to increase the efficiency of transfer of articles. Also, according to the present configuration, in order to achieve the state in which the downward-directed first opening faces the upward-directed second opening, the up-down relationship between the bottom portion and the top portion of the first container is inverted by the inversion mechanism. Arranging the opening and closing member in the closed state in the first opening can avoid the articles W from falling from the first container, and can suppress imbalanced distribution of the articles W in the first container. Thereafter, it is thus possible to appropriately transfer the articles to the second container. According to the present configuration, as described above, it is possible to appropriately transfer articles between different containers, and increase the transfer efficiency.

Preferably, the first container has a container height direction, which is a direction connecting the bottom portion and the top portion of the first container, and
 the inter-container transfer apparatus further includes
  an adjustment mechanism configured to adjust a position of the opening and closing member in the container height direction relative to the bottom portion of the first container.

According to the present configuration, it is possible to adjust the position of the opening and closing member according to the height of articles contained in the first container. Therefore, it is easy to suppress the articles in the first container from moving when the first container is inverted by the inversion mechanism, and achieve appropriate transfer of the articles to the second container thereafter.

Preferably, the adjustment mechanism performs, at least while the holding mechanism is being inverted by the inversion mechanism, a pressing operation of pressing the articles in the first container in the container height direction with use of the opening and closing member in the closed state.

According to the present configuration, it is easy to further suppress the articles in the first container from moving when the first container is inverted by the inversion mechanism.

Preferably, the first container has a side wall portion standing upright from a peripheral edge of the bottom portion of the first container in the container height direction, the opening and closing member includes:
a facing portion extending parallel to the bottom portion of the first container and facing the articles in the first container while the opening and closing member is in the closed state;
an extending portion extending from the facing portion in the container height direction while the opening and closing member is in the closed state; and
a coupling portion coupling the extending portion with the adjustment mechanism, and
the extending portion extends along an inner surface of the side wall portion of the first container in a state in which the facing portion is inside the first container.

According to the present configuration, when the position of the facing portion is adjusted based on the height of the articles contained in the first container by the adjustment mechanism, it is easy to avoid the opening and closing member and the side wall portion of the first container from interfering with each other. Therefore, it is easy to adjust the position of the facing portion to an appropriate position based on the height of the articles, while avoiding the interference between the opening and closing member and the first container.

Preferably, the inter-container transfer apparatus further includes: a frame body on which the holding mechanism, the opening and closing member, and the adjustment mechanism are supported,
wherein the frame body surrounds the first container held by the holding mechanism when viewed in the up-down direction,
the movement mechanism is configured to move the frame body at least in the up-down direction, and
the inversion mechanism is configured to rotate the frame body.

According to the present configuration, by lifting/lowering and inverting the frame body, it is possible to lift/lower the holding mechanism, and invert the first container held by the holding mechanism. Therefore, the configuration of the inter-container transfer apparatus can easily be simplified.

Preferably, the second container is a carton container having a flap for closing the second opening,
the opening and closing member includes:
a first door configured to swing around a first shaft; and
a second door configured to swing around a second shaft,
while the first container is held by the holding mechanism, the first shaft and the second shaft are respectively on opposite sides of the first container, and are parallel to each other, and
the first door, which swings around the first shaft from the closed state into the open state, and the second door, which swings around the second shaft from the closed state into the open state, are configured to press the flap in a direction in which the second opening is open, in response to the first opening facing the second opening.

According to the present configuration, if the second container is a carton container having a flap, bringing the first door and the second door into an open state will make it possible to press the flap of the carton container so that the flap is retracted from the fall path of articles. Accordingly, it is possible to avoid such a situation that the flap prevents the transfer of the articles W.

Preferably, the inter-container transfer apparatus further includes:
two transfer units including a first transfer unit and a second transfer unit that each include a set of the holding mechanism, the movement mechanism, the inversion mechanism, the opening and closing member, and the opening and closing drive mechanism;
a first conveyance device configured to convey the first container in a first direction; and
a second conveyance device extending parallel to the first conveyance device and configured to convey the second container in the first direction,
wherein the first transfer unit and the second transfer unit are at different positions in the first direction,
the movement mechanism of each of the first transfer unit and the second transfer unit is configured to move the corresponding holding mechanism in the up-down direction and a second direction that intersects with the first direction when viewed in the up-down direction,
in a state in which (i) one first container and another first container are at different positions in the first direction on the first conveyance device, and (ii) the second container is aligned with the one first container in the second direction, the first transfer unit transfers the articles from the one first container to the second container,
the second conveyance device moves the second container to a position at which the second container is aligned with the other first container in the second direction, and
the second transfer unit transfers the articles from the other first container to the second container.

According to the present configuration, by alternately operating the two transfer units, it is possible to efficiently transfer the articles from a plurality of first containers to one second container. Also, at this time, the movement of the second container based on the positions of the two first containers can be performed by the second conveyance device that is conveying the second container. Therefore, the configuration of the inter-container transfer apparatus can easily be simplified.

Preferably, the inter-container transfer apparatus further includes: a control device configured to control the holding mechanism, the movement mechanism, the inversion mechanism, and the opening and closing drive mechanism,
wherein, when articles contained in a plurality of the first containers are transferred to at least one second container, the control device estimates, each time the articles are transferred from a first container to a target second container, which is a second container serving as a target of transfer, a remaining volume of the target second container indicating a volume of the articles that can be contained, and
the control device compares an article volume of the articles contained in a planned first container, which is a first container from which the articles are planned to be transferred to the target second container, with the remaining volume of the target second container, and in response to the article volume being smaller than the remaining volume, the control device performs transfer of the articles from the planned first container to the target second container, and in response to the article volume being greater than the remaining volume, the control device performs transfer of the articles from the planned first container to another second container.

According to the present configuration, by efficiently using the volume of a second container, it is possible to transfer articles the second container. Also, it is possible to prevent excessive transfer to the second container, and as a result, it is possible to avoid such a situation that the transferred articles protrude from the second container.

Preferably, the inter-container transfer apparatus further includes: a control device configured to control the holding mechanism, the movement mechanism, the inversion mechanism, and the opening and closing drive mechanism; and
- a space size detection unit configured to detect a size in the up-down direction of an empty space, in which no article is contained, in the second container, at a plurality of positions of the second container in a horizontal direction,
- wherein the second opening is larger than the first opening,
- the movement mechanism is configured to move the holding mechanism in the horizontal direction, and
- the control device brings the opening and closing member into the open state in response to the position of the empty space having the largest size in the up-down direction detected by the space size detection unit overlapping with the first opening when viewed in the up-down direction.

According to the present configuration, a plurality of articles can easily be arranged in the second container in a balanced manner.

According to the present disclosure, an inter-container transfer method for transferring articles contained in a first container to a second container,
- the first container having a bottom portion that is closed, and a top portion that is a first opening,
- the second container having a bottom portion that is closed, and a top portion that is a second opening,
- the inter-container transfer method being performed using an inter-container transfer apparatus including: a holding mechanism configured to hold the first container; a movement mechanism configured to move the holding mechanism; an inversion mechanism configured to invert an up-down relationship between the bottom portion and the top portion of the first container held by the holding mechanism; an opening and closing member changeable between (i) a closed state, in which the opening and closing member is arranged in the first opening of the first container held by the holding mechanism to close the first opening, and (ii) an open state of opening the first opening; and an opening and closing drive mechanism configured to drive the opening and closing member to perform an opening/closing operation,
- the inter-container transfer method comprising:
- a first container holding step of holding the first container in which the articles (W) are contained with the first opening directed upward, with use of the holding mechanism;
- an opening and closing member arrangement step of arranging the opening and closing member in the closed state in the first opening of the first container;
- an inversion step of inverting, while the first container is held by the holding mechanism with the first opening directed upward, the first container to direct the first opening downward with use of the inversion mechanism, the inversion step being performed after the first container holding step and the opening and closing member arrangement step;
- a movement step of moving the holding mechanism so that (i) the first container is located above the second container, and (ii) the first container and the second container overlap each other when viewed in an up-down direction; and
- a transfer step of bringing the opening and closing member from the closed state into the open state, in response to the downward-directed first opening facing the second opening from above, and transferring the articles contained in the first container into the second container, the transfer step being performed after the inversion step and the movement step.

INDUSTRIAL APPLICABILITY

The technique according to the present disclosure is applicable to an inter-container transfer apparatus and an inter-container transfer method for transferring articles contained in a first container to a second container.

The invention claimed is:
1. An inter-container transfer apparatus for transferring articles contained in a first container to a second container, wherein:
- the first container has a bottom portion that is closed, and a top portion that is a first opening,
- the second container has a bottom portion that is closed, and a top portion that is a second opening,
- the inter-container transfer apparatus comprises:
  - a holding mechanism configured to hold the first container;
  - a movement mechanism configured to move the holding mechanism;
  - an inversion mechanism configured to invert an up-down relationship between the bottom portion and the top portion of the first container held by the holding mechanism;
  - an opening and closing member changeable between (i) a closed state, in which the opening and closing member is arranged in the first opening of the first container to close the first opening, and (ii) an open state of opening the first opening; and
  - an opening and closing drive mechanism configured to drive the opening and closing member to perform an opening/closing operation,
- while the first container is held by the holding mechanism with the first opening directed upward, the inversion mechanism inverts the first container to direct the first opening downward,
- the movement mechanism moves the holding mechanism so that (i) the first container is located above the second container, and (ii) the first container and the second container overlap each other when viewed in an up-down direction,
- the opening and closing drive mechanism brings the opening and closing member into the closed state while the holding mechanism is inverted by the inversion mechanism and while the holding mechanism is moved by the movement mechanism, and brings the opening and closing member into the open state in response to the downward-directed first opening facing the second opening from above; and
- wherein the first container has a container height direction, which is a direction connecting the bottom portion and the top portion of the first container, and
- wherein the inter-container transfer apparatus further comprises:
  - an adjustment mechanism configured to adjust a position of the opening and closing member in the container height direction relative to the bottom portion of the first container.

2. The inter-container transfer apparatus according to claim 1,
wherein the adjustment mechanism performs, at least while the holding mechanism is inverted by the inversion mechanism, a pressing operation of pressing the articles in the first container in the container height direction with use of the opening and closing member in the closed state.

3. The inter-container transfer apparatus according to claim 1, wherein:
the first container has a side wall portion standing upright from a peripheral edge of the bottom portion of the first container in the container height direction,
the opening and closing member comprises:
a facing portion extending parallel to the bottom portion of the first container and facing the articles in the first container while the opening and closing member is in the closed state;
an extending portion extending from the facing portion in the container height direction while the opening and closing member is in the closed state; and
a coupling portion coupling the extending portion with the adjustment mechanism, and
the extending portion extends along an inner surface of the side wall portion of the first container in a state in which the facing portion is inside the first container.

4. The inter-container transfer apparatus according to claim 1, further comprising:
a frame body on which the holding mechanism, the opening and closing member, and the adjustment mechanism are supported,
wherein the frame body surrounds the first container held by the holding mechanism when viewed in the up-down direction,
wherein the movement mechanism is configured to move the frame body at least in the up-down direction, and
wherein the inversion mechanism is configured to rotate the frame body.

5. The inter-container transfer apparatus according to claim 1, further comprising:
a control device configured to control the holding mechanism, the movement mechanism, the inversion mechanism, and the opening and closing drive mechanism,
wherein, when articles contained in a plurality of the first containers are transferred to at least one second container, the control device estimates, each time the articles are transferred from a first container to a target second container, which is a second container serving as a target of transfer, a remaining volume of the target second container indicating a volume of the articles that can be contained, and
wherein the control device compares an article volume of the articles contained in a planned first container, which is a first container from which the articles are planned to be transferred to the target second container, with the remaining volume of the target second container, and in response to the article volume being smaller than the remaining volume, the control device performs transfer of the articles from the planned first container to the target second container, and in response to the article volume being greater than the remaining volume, the control device performs transfer of the articles from the planned first container to another second container.

6. The inter-container transfer apparatus according to claim 1, further comprising:

a control device configured to control the holding mechanism, the movement mechanism, the inversion mechanism, and the opening and closing drive mechanism; and
a space size detection unit configured to detect a size in the up-down direction of an empty space, in which no article is contained, in the second container, at a plurality of positions of the second container in a horizontal direction,
wherein the second opening is larger than the first opening,
wherein the movement mechanism is configured to move the holding mechanism in the horizontal direction, and
wherein the control device brings the opening and closing member into the open state in response to the position of the empty space having the largest size in the up-down direction detected by the space size detection unit overlapping with the first opening when viewed in the up-down direction.

7. An inter-container transfer apparatus for transferring articles contained in a first container to a second container, wherein:
the first container has a bottom portion that is closed, and a top portion that is a first opening,
the second container has a bottom portion that is closed, and a top portion that is a second opening,
the inter-container transfer apparatus comprises:
a holding mechanism configured to hold the first container;
a movement mechanism configured to move the holding mechanism;
an inversion mechanism configured to invert an up-down relationship between the bottom portion and the top portion of the first container held by the holding mechanism;
an opening and closing member changeable between (i) a closed state, in which the opening and closing member is arranged in the first opening of the first container to close the first opening, and (ii) an open state of opening the first opening; and
an opening and closing drive mechanism configured to drive the opening and closing member to perform an opening/closing operation,
while the first container is held by the holding mechanism with the first opening directed upward, the inversion mechanism inverts the first container to direct the first opening downward,
the movement mechanism moves the holding mechanism so that (i) the first container is located above the second container, and (ii) the first container and the second container overlap each other when viewed in an up-down direction,
the opening and closing drive mechanism brings the opening and closing member into the closed state while the holding mechanism is inverted by the inversion mechanism and while the holding mechanism is moved by the movement mechanism, and brings the opening and closing member into the open state in response to the downward-directed first opening facing the second opening from above; and
the second container is a carton container having a flap for closing the second opening,
the opening and closing member comprises:
a first door configured to swing around a first shaft; and
a second door configured to swing around a second shaft, while the first container is held by the holding mechanism, the first shaft and the second shaft are respectively on opposite sides of the first container, and are parallel to each other, and the first door, which swings around the first shaft from the closed state into the open state, and the second door, which swings around the second shaft from the closed state into the open state, are configured to press the flap in a direction in which the second opening is open, in response to the first opening facing the second opening.

8. An inter-container transfer apparatus for transferring articles contained in a first container to a second container, wherein:

the first container has a bottom portion that is closed, and a top portion that is a first opening, the second container has a bottom portion that is closed, and a top portion that is a second opening, the inter-container transfer apparatus comprises:

a holding mechanism configured to hold the first container;

a movement mechanism configured to move the holding mechanism;

an inversion mechanism configured to invert an up-down relationship between the bottom portion and the top portion of the first container held by the holding mechanism;

an opening and closing member changeable between (i) a closed state, in which the opening and closing member is arranged in the first opening of the first container to close the first opening, and (ii) an open state of opening the first opening; and an opening and closing drive mechanism configured to drive the opening and closing member to perform an opening/closing operation, while the first container is held by the holding mechanism with the first opening directed upward, the inversion mechanism inverts the first container to direct the first opening downward, the movement mechanism moves the holding mechanism so that (i) the first container is located above the second container, and (ii) the first container and the second container overlap each other when viewed in an up-down direction, the opening and closing drive mechanism brings the opening and closing member into the closed state while the holding mechanism is inverted by the inversion mechanism and while the holding mechanism is moved by the movement mechanism, and brings the opening and closing member into the open state in response to the downward-directed first opening facing the second opening from above; and two transfer units comprising a first transfer unit and a second transfer unit that each comprise a set of the holding mechanism, the movement mechanism, the inversion mechanism, the opening and closing member, and the opening and closing drive mechanism;

a first conveyance device configured to convey the first container in a first direction; and a second conveyance device extending parallel to the first conveyance device and configured to convey the second container in the first direction, wherein:

the first transfer unit and the second transfer unit are at different positions in the first direction, the movement mechanism of each of the first transfer unit and the second transfer unit is configured to move the corresponding holding mechanism in the up-down direction and a second direction that intersects with the first direction when viewed in the up-down direction, in a state in which (i) one first container and another first container are at different positions in the first direction on the first conveyance device, and (ii) the second container is aligned with the one first container in the second direction, the first transfer unit transfers the articles from the one first container to the second container, the second conveyance device moves the second container to a position at which the second container is aligned with the other first container in the second direction, and the second transfer unit transfers the articles from the other first container to the second container.

* * * * *